(12) United States Patent
Ohta et al.

(10) Patent No.: US 11,554,371 B2
(45) Date of Patent: Jan. 17, 2023

(54) PRECISE FLUID INPUT CONTROL FOR POINT-OF-CARE DEVICES

(71) Applicant: International Business Machines Corporation, Armonk, NY (US)

(72) Inventors: Ricardo Luis Ohta, Sao Paulo (BR); Jaione Tirapu Azpiroz, Rio de Janeiro (BR); Matheus Esteves Ferreira, Rio de Janeiro (BR); Daniel Vitor Lopes Marcondes Marçal, Rio de Janeiro (BR); Ademir Ferreira Da Silva, Sao Paulo (BR); Mathias B Steiner, Rio de Janeiro (BR)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 17/138,024

(22) Filed: Dec. 30, 2020

(65) Prior Publication Data

US 2022/0203358 A1 Jun. 30, 2022

(51) Int. Cl.
*B01L 3/00* (2006.01)
*F03G 7/06* (2006.01)

(52) U.S. Cl.
CPC ..... *B01L 3/50273* (2013.01); *B01L 3/502707* (2013.01); *B01L 3/502715* (2013.01); *F03G 7/06* (2013.01); *B01L 2200/0642* (2013.01); *B01L 2200/12* (2013.01);
(Continued)

(58) Field of Classification Search
CPC ......... B01L 2200/0642; B01L 2200/12; B01L 2300/069; B01L 2300/0816; B01L 2300/0825; B01L 2300/0848; B01L 2300/123; B01L 2400/0406; B01L 2400/082; B01L 2400/086;
(Continued)

(56) References Cited

U.S. PATENT DOCUMENTS

| 8,047,443 B2 | 11/2011 | DePaula |
| 10,144,201 B2 | 12/2018 | Nairn et al. |
| 10,710,070 B2 | 7/2020 | Kozicki et al. |

(Continued)

FOREIGN PATENT DOCUMENTS

| CN | 101346679 A | 1/2009 |
| CN | 101460246 A | 6/2009 |

(Continued)

OTHER PUBLICATIONS

International Search Report dated Mar. 29, 2022 issued in PCT/IB2021/061921, 11 pages.

(Continued)

*Primary Examiner* — Jennifer Wecker
(74) *Attorney, Agent, or Firm* — Scully Seott Murphy & Presser, P.C.; Joseph Petrokaitis

(57) ABSTRACT

Devices and methods for controlling collection of liquid sample are described. In an example, a microfluidic device can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device.

25 Claims, 15 Drawing Sheets

(52) U.S. Cl.
CPC . *B01L 2300/0816* (2013.01); *B01L 2300/123* (2013.01); *B01L 2400/082* (2013.01)

(58) Field of Classification Search
CPC ......... B01L 3/502707; B01L 3/502715; B01L 3/50273; F03G 7/06
See application file for complete search history.

(56) References Cited

U.S. PATENT DOCUMENTS

| | | | |
|---|---|---|---|
| 2018/0104685 A1* | 4/2018 | Ryans | G01N 33/558 |
| 2019/0184393 A1 | 6/2019 | Mahmud et al. | |
| 2019/0302008 A1 | 10/2019 | Ohta et al. | |
| 2020/0282395 A1 | 9/2020 | Tirapu Azpiroz et al. | |

FOREIGN PATENT DOCUMENTS

| | | | | |
|---|---|---|---|---|
| CN | 107486268 A | | 12/2017 | |
| CN | 109671250 A | * | 4/2019 | ............. D21H 19/14 |
| CN | 109671250 A | | 4/2019 | |
| CN | 211358870 U | | 8/2020 | |
| WO | WO-2018020796 A1 | * | 2/2018 | ............... F03G 7/06 |

OTHER PUBLICATIONS

Amjadi et al. "High- Performance Multiresponsive Paper Actuators." ACS Nano; www.acsnano.org, DOI: 10.1021/acsnano. 6b05545. Received Aug. 17, 2016; Accepted Oct. 15, 2016; Published Oct. 16, 2016. pp. 10202-10210, 10.

Schaumburg et al. "USB Powered Microfluidic Paper-Based Analytical Devices." Research Gate; https://doi.org/10.1002/elps. 201900273. Nov. 2019. pp. 1-15.

Kim et al. "Recent Advances of Fluid Manipulation Technologies in Microfluidic Paper-Based Analytical Devices (uPADs) toward Multi-Step Assays." Micromachines; doi:10.3390/mi11030269. Received Feb. 14, 2020; Accepted Mar. 3, 2020; Published Mar. 4, 2020. pp. 1-30; 11, 269.

Hu et al. "Multifunctional Soft Actuators Based on Anisotropic Paper/ Polymer Bilayer Toward Bioinspired Applications." Adv. Mater. Technol;DOI: 10.1002/admt.201800674. Jan. 2019. 11 pages.

Hines et al. "Soft Actuators for Small-Scale Robotics." Advanced Science News; DOI: 10.1002/adma.201603483. Dec. 29, 2016. 43 pages.

IBM. "IBM AgroPad—AI-powered Technology to Health-Check Soil and Water." IBM Research—Brazil Industrial Technology & Science. Jan. 31, 2019. 8 pages.

Detsi et al. "Metallic Muscles at Work:High Rate Actuation in Nanoporous Gold/ Polyaniline Composites." ACS Nano; www.acsnano.org; DOI:10.1021/nn400803x. Received Feb. 17, 2013; Accepted and Published online Apr. 12, 2013. pp. 4299-4306. vol. 7 No. 5.

Hu et al. "A Spongy Graphene based Bimorph Actuator with Ultra-large Displacement towards Biomimetic Application." Royal Society of Chemistry, Nanoscale, www.rsc.org/nanoscale; DOI: 10.1039/c4nr02768j. Received May 20, 2014; Accepted Aug. 22, 2014. pp. 12703-12709. vol. 6.

Deng et al. "Tunable Photothermal Actuators Based on a Pre-programmed Aligned Nanostructure" Journal of the American Chemical Society, pubs.acs.org/JACS; DOI: 10.1021/jacs.5b10131. Received Oct. 1, 2015 and Published Dec. 17, 2015. pp. 225-230. vol. 138.

Chen et al. "Large-Deformation Curling Actuators Based on Carbon Nanotube Composite: Advanced-Structure Design and Biomimetic Application." ACS Nano; www.acsnano.org; DOI:10.1021/acsnano. 5b05413. Received Aug. 28, 2015; Accepted Oct. 23, 2015; Published online Oct. 29, 2015. pp. 12189-12196. vol. 9, No. 12.

INSTTOOLS. "Bimetallic Thermometer." https://instrumentationtools.com/bimetallic-thermometer/. Accessed Dec. 30, 2020. 12 pages.

Wikipedia. "Antifuse." https://en.wikipedia.org/wiki/Antifuse. Last edited Nov. 16, 2019. 5 pages.

\* cited by examiner

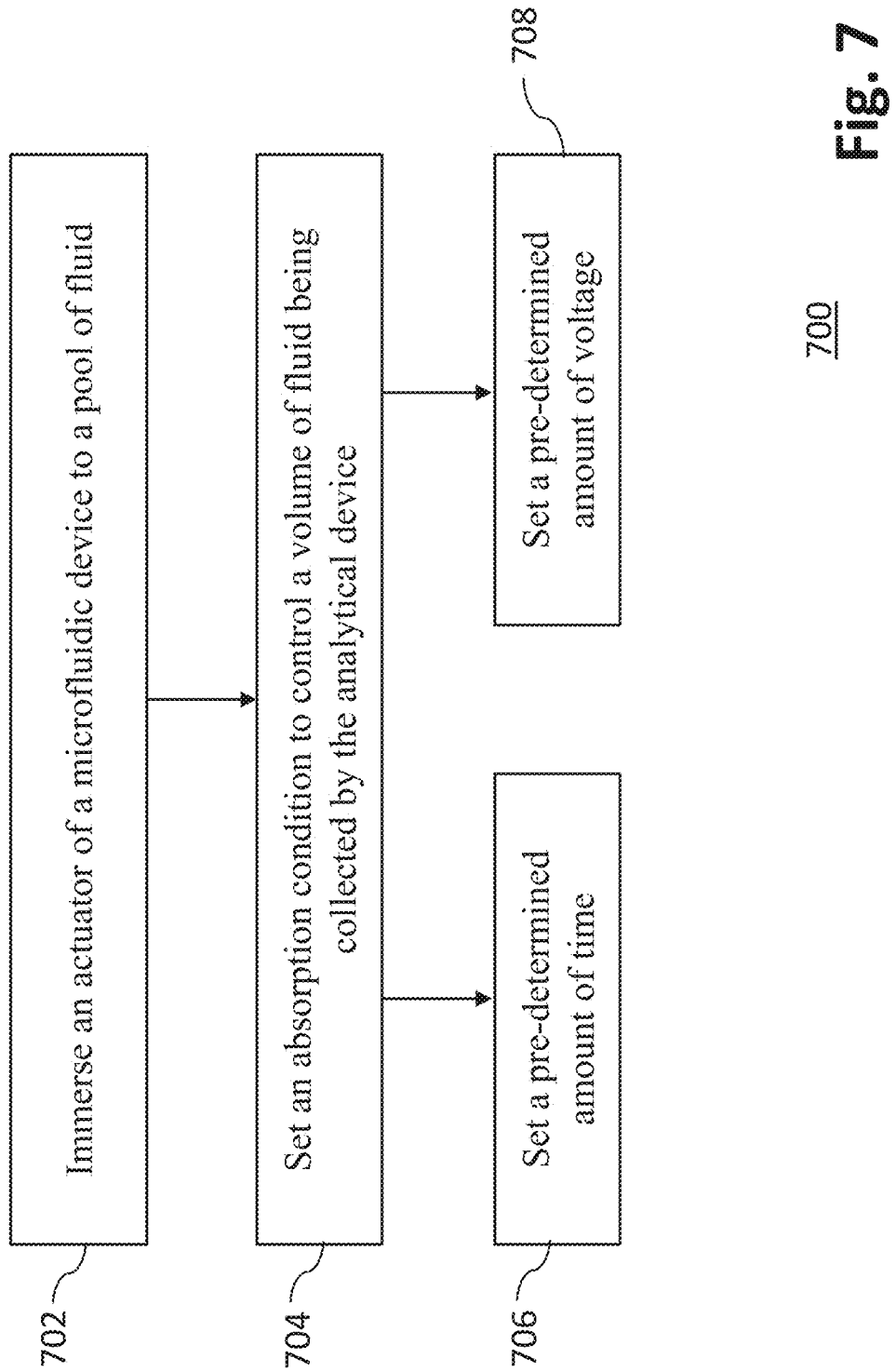

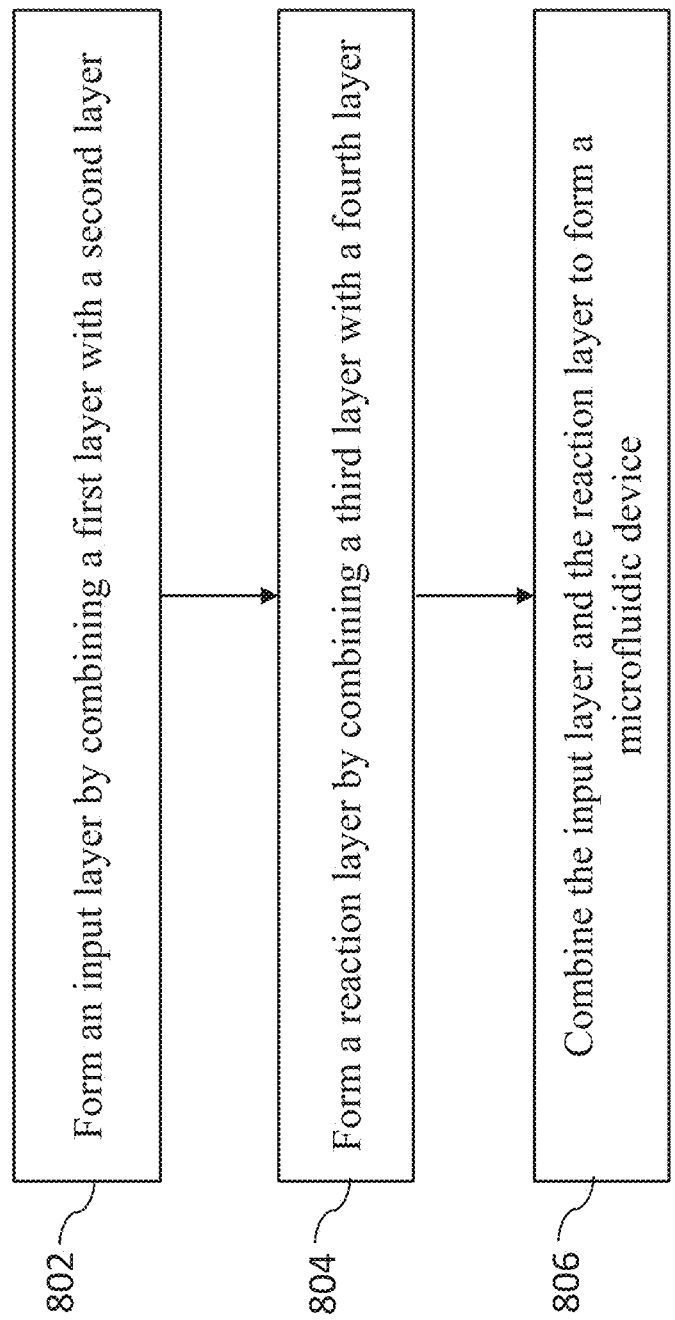

PRECISE FLUID INPUT CONTROL FOR POINT-OF-CARE DEVICES

BACKGROUND

The present disclosure relates in general to paper-based microfluidic devices and methods of autonomous sample collection by paper-based microfluidic devices.

Paper-based microfluidic devices may require precise control of input sample or buffer volume. Inaccurate amount of input sample can lead to decrease in result precision and increase in error results. External tools such as pipettes can be used to provide a measured amount of input sample, but measurement from these external tools can be prone to errors, especially for miniscule sample volume (e.g., microliter range). Laboratory grade external tools, such as laboratory grade pipettes, can be expensive and may be unsuitable for applications such as point-of-care (PoC) applications.

SUMMARY

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material and a second layer of a second material having different swelling rates.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material and a second layer of a second material having different swelling rates. The first material can be paper and the second material can be polypropylene.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can include the actuator absorbing the fluid for a pre-determined amount of time.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can include the actuator absorbing the fluid for a pre-determined amount of time. The volume of fluid collected by the analytical device can be based on the pre-determined amount of time.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The analytical device can be a microfluidic paper-based analytical device (µPAD).

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material, a second layer of a second material, and a third layer of a third material. The first material and the second material can have different swelling rates, and the third material can be a conductive material.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material, a second layer of a second material, and a third layer of a third material. The first material and the second material can have different swelling rates, and the third material can be a conductive material. The layer of conductive materials can be one of silver nanowire (AgNW) and a combination of AgNW and poly(3,4-ethylenedioxythiophene) polystyrenesulfonate (PEDOT:PPS).

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can be an application of a pre-determined amount of voltage to the actuator via the third layer of material.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can be an application of a pre-determined amount of voltage to the actuator via the third layer of material. The volume of fluid collected by the analytical device can be based on the pre-determined amount of voltage.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material and a second layer of a second material having different swelling rates.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material and a second layer of a second material having different swelling rates. The first material can be paper and the second material can be polypropylene.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The setting of absorption condition can include setting a pre-determined amount of time for the actuator to absorb the volume of fluid.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The analytical device can be a microfluidic paper-based analytical device (μPAD).

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material, a second layer of a second material, and a third layer of a third material. The first material and the second material can have different swelling rates, and the third material can be a conductive material.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material, a second layer of a second material, and a third layer of a third material. The first material and the second material can have different swelling rates, and the third material can be a conductive material. The layer of conductive materials can be one of silver nanowire (AgNW) and a combination of AgNW and poly(3,4-ethylenedioxythiophene) polystyrenesulfonate (PEDOT:PPS).

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The setting of the absorption condition can include setting a pre-determined amount of voltage to be applied to the actuator via the third layer of material in response to immersing the actuator into a pool of fluid.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third substrate layer including a distribution element with a fourth substrate layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third substrate layer including a distribution element with a fourth substrate layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The input layer can be formed by combining the first layer and the second layer with a layer of conductive materials.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The input layer can be formed by combining the first layer and the second layer with a layer of conductive materials. The layer of conductive materials can be one of silver nanowire (AgNW); and a combination of AgNW and poly(3,4-ethylenedioxythiophene) polystyrenesulfonate (PEDOT:PPS).

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The first material and the second material can have different swelling rates.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The first material can be paper and the second material can be polypropylene.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The first substrate and the second substrate can be composed of paper and wax.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The analytical device can be a microfluidic paper-based analytical device (µPAD).

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 7 is a flow diagram illustrating a process to implement precise fluid input control of point-of-care devices in one embodiment.

FIG. 8 is a flow diagram illustrating a process to form a microfluidic device in one embodiment.

DETAILED DESCRIPTION

Figure 1A:
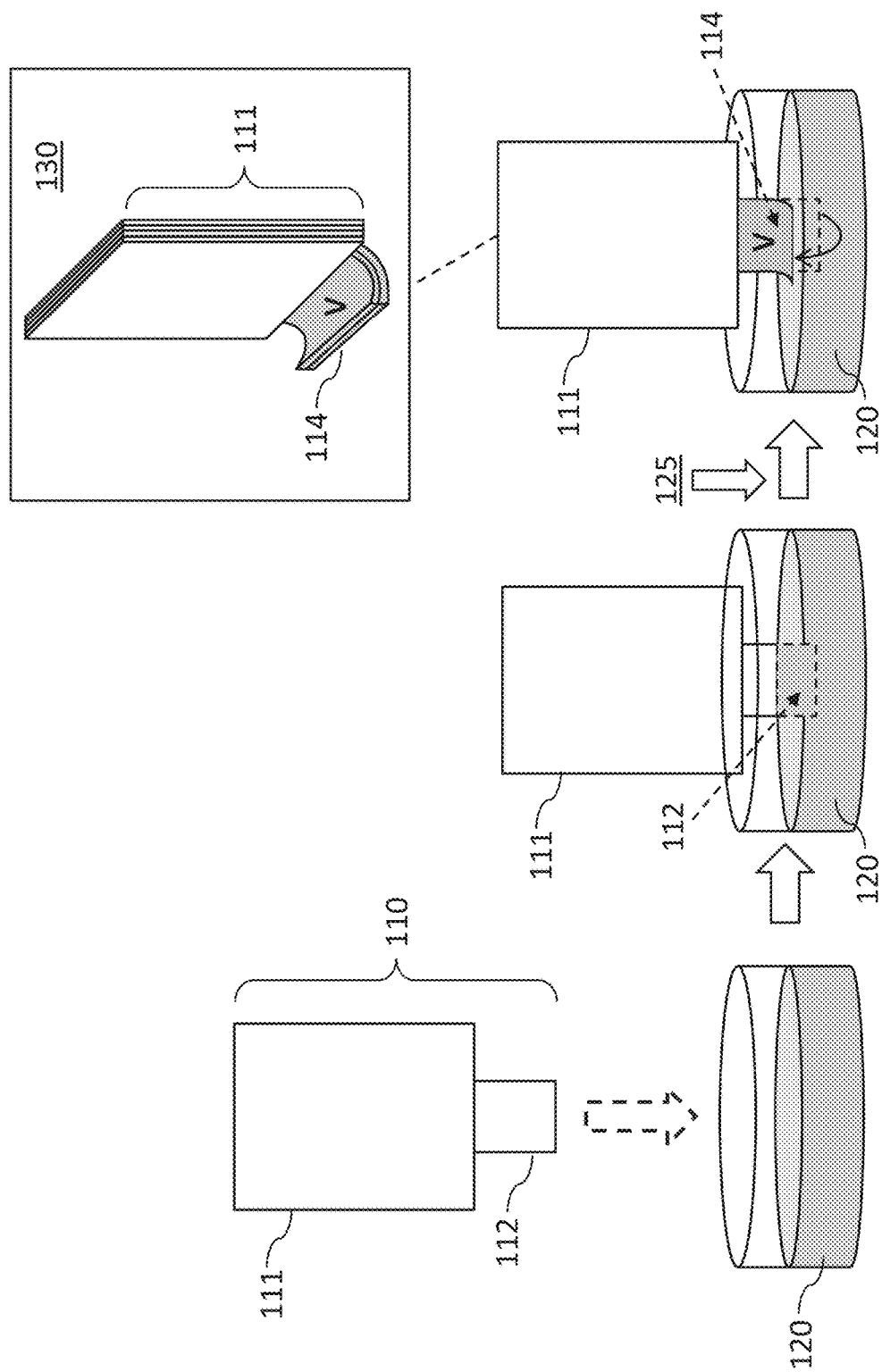
FIG. 1A is a diagram showing an example implementation of precise fluid input control of point-of-care devices in one embodiment.

In some examples, point-of-care applications can include lateral flow assays of samples and reagents in miniscule scale or order, such as, sample deposition of approximately 10 microliters (µL) of blood and reagent pipetting of approximately 100 µL of saline solution. In an example, disposable plastic pipettes can be used in various applications and can be an inexpensive tool, but disposable plastic pipettes typically have low volume accuracy (e.g., may be accurate up to the milliliter (mL) range). In another example, laboratory grade microliter pipette can provide accuracy in sample volume, but can be very expensive and may be unsuitable for point-of-care applications. For example, such laboratory grade pipettes may not satisfy the World Health Organization ASSURED (Affordable, Sensitive, Specific, User-friendly, Rapid and robust, Equipment-free and Deliverable to end-users) criteria for diagnostic tests usage in resource-constrained countries.

The devices, systems, and methods described herein can provide an autonomous approach to collect samples for microfluidic devices with precision. The autonomous approach includes leveraging a mechanism that self-limits liquid input volume. Further, the autonomous approach can improve usability and accuracy of microfluidic devices in point-of-care applications by removing a need for using external tools, lowering test cost and test kit complexity/volume. Furthermore, the devices, systems, and methods described herein can achieve relatively high accuracy, such as in the microliter range, for fluid or liquid inputs (e.g., sample or buffer) for point-of-care or microfluidics applications without a need for expensive volume control tools. Still further, the structure being described herein can be made of materials that are carefully chosen to achieve the autonomous approach and accuracy, thus providing a reliable and repeatable approach to limit the liquid or fluid input volume to point-of-care or microfluidic devices. Also, some applications can involve colorimetric reactions that may require a repeatable ratio of reagent and sample to obtain a consistent output. This devices, systems, and methods described herein can provide an approach for a repeatable ratio of reagent and sample to obtain consistent outputs without the need of expensive tools, such as laboratory grade pipettes, and without reliance on manual control of external tools or operator manual ability.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The deformation of the actuator can provide a precise and autonomous collection of sample fluid for the analytical device.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material and a second layer of a second material having different swelling rates. The first and second layers having different swelling rates can facilitate the deformation of the actuator. The deformation of the actuator can provide a precise and autonomous collection of sample fluid for the analytical device.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material and a second layer of a second material having different swelling rates. The first material can be paper and the second material can be polypropylene. Materials such as paper and polypropylene can be readily available and can be relatively inexpensive materials.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can include the actuator absorbing the fluid for a pre-determined amount of time. The pre-determined amount of time can allow the actuator to autonomously retract when adequate sample fluid is collected by the analytical device.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can include the actuator absorbing the fluid for a pre-determined amount of time. The volume of fluid collected by the analytical device can be based on the pre-determined amount of time. The volume of fluid collected by analytical device can be relatively easy to control by controlling the pre-determined amount of time.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The analytical device can be a microfluidic paper-based analytical device (μPAD). Analytical devices such as μPADs can be portable and cost friendly.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material, a second layer of a second material, and a third layer of a third material. The first material and the second material can have different swelling rates, and the third material can be a conductive material. The first and second layers having different swelling rates can facilitate the deformation of the actuator. The deformation of the actuator can provide a precise and autonomous collection of sample fluid for the analytical device. The third layer of conductive materials can facilitate application of external stimulus to deform the actuator.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The actuator can include a first layer of a first material, a second layer of a second material, and a third layer of a third material. The first material and the second material can have different swelling rates, and the third material can be a conductive material. The layer of conductive materials can be one of silver nanowire (AgNW) and a combination of AgNW and poly(3,4-ethylenedioxythiophene) polystyrenesulfonate (PEDOT:PPS). These conductive materials can be readily available.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can be an application of a pre-determined amount of voltage to the actuator via the third layer of material. The pre-determined amount of voltage can allow the actuator to autonomously retract when adequate sample fluid is collected by the analytical device.

In some examples, an apparatus for controlling a collection of liquid sample is generally described. The apparatus can include an analytical device and an actuator. The actuator can be connected to the analytical device. The actuator can be operable to absorb fluid. The actuator can guide the absorbed fluid to an input layer of the analytical device. The actuator can deform in response to an occurrence of an absorption condition. A degree of deformation of the actuator indicates a volume of fluid collected by the analytical device. The absorption condition can be an application of a pre-determined amount of voltage to the actuator via the third layer of material. The volume of fluid collected by the analytical device can be based on the pre-determined amount of voltage. The volume of fluid collected by analytical device can be relatively easy to control by controlling the pre-determined amount of voltage.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The deformation of the actuator can provide a precise and autonomous collection of sample fluid for the analytical device.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material and a second layer of a second material having different swelling rates. The first and second layers having different swelling rates can facilitate the deformation of the actuator. The deformation of the actuator can provide a precise and autonomous collection of sample fluid for the analytical device.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material and a second layer of a second material having different swelling rates. The first material can be paper and the second material can be polypropylene. Materials such as paper and polypropylene can be readily available and can be relatively inexpensive materials.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The setting of the absorption condition can include setting a pre-determined amount of time for the actuator to absorb the volume of fluid. The pre-determined amount of time can allow the actuator to autonomously retract when adequate sample fluid is collected by the analytical device. The volume of fluid collected by analytical device can be relatively easy to control by controlling the pre-determined amount of time.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The analytical device can be a microfluidic paper-based analytical device (µPAD). Analytical devices such as µPADs can be portable and cost friendly.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material, a second layer of a second material, and a third layer of a third material. The first material and the second material can have different swelling rates, and the third material can be a conductive material. The first and second layers having different swelling rates can facilitate the deformation of the actuator. The deformation of the actuator can provide a precise and autonomous collection of sample fluid for the analytical device. The third layer of conductive materials can facilitate application of external stimulus to deform the actuator.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The actuator can include a first layer of a first material, a second layer of a second material, and a third layer of a third material. The first material and the second material can have different swelling rates, and the third material can be a conductive material. The layer of conductive materials can be one of silver nanowire (AgNW) and a combination of AgNW and poly(3,4-ethylenedioxythiophene) polystyrenesulfonate (PEDOT:PPS). These conductive materials can be readily available.

In some examples, a method for controlling a volume of fluid being collected by an analytical device is generally described. The method can include immersing an actuator of a microfluidic device into a pool of fluid to cause an absorption of the fluid by the actuator. The actuator can be connected to an analytical device of the microfluidic device. The method can further include setting an absorption condition to control a volume of fluid being collected by the analytical device. The actuator can deform in response to an occurrence of the absorption condition. A degree of the deformation of the actuator can indicate the volume of fluid being collected by the analytical device. The setting of the absorption condition can include setting a pre-determined amount of voltage to be applied to the actuator via the third layer of material in response to immersing the actuator into a pool of fluid. The pre-determined amount of voltage can allow the actuator to autonomously retract when adequate sample fluid is collected by the analytical device. The volume of fluid collected by analytical device can be relatively easy to control by controlling the pre-determined amount of voltage.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The deformation of the actuator can provide a precise and autonomous collection of sample fluid for the analytical device.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The input layer can be formed by combining the first layer and the second layer with a layer of conductive materials. The third layer of conductive materials can facilitate application of external stimulus to deform the actuator.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The input layer can be formed by combining the first layer and the second layer with a layer of conductive materials. The layer of conductive materials can be one of silver nanowire (AgNW); and a combination of AgNW and poly(3,4-ethylenedioxythiophene) polystyrenesulfonate (PEDOT:PPS). These conductive materials can be readily available.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The first material and the second material can have different swelling rates. The first and second layers having different swelling rates can facilitate the deformation of the actuator.

The deformation of the actuator can provide a precise and autonomous collection of sample fluid for the analytical device.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The first material can be paper and the second material can be polypropylene. Materials such as paper and polypropylene can be readily available and can be relatively inexpensive materials.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The first substrate and the second substrate can be composed of paper and wax. Materials such as paper and wax can be readily available and can be relatively inexpensive materials.

In some examples, a method for forming a microfluidic device is generally described. The method can include forming an input layer by combining a first layer including a first substrate and a first actuator layer with a second layer including a second substrate and a second actuator layer. The first actuator layer can be extended from an edge of the first substrate by a specific length. The first actuator layer can be composed of a first material. The second actuator layer can be extended from an edge of the second substrate by the specific length. The second actuator layer can be composed of a second material different from the first material. The method can further include forming a reaction layer by combining a third layer including a distribution element with a fourth layer including at least one reaction chamber. The method can further include combining the input layer and the reaction layer to form a microfluidic device. The formed microfluidic device can include an analytical device and an actuator. The actuator can include the first actuator layer and the second actuator layer. The actuator can deform in response to an occurrence of an absorption condition relating to an immersion of the actuator in a pool of liquid. The analytical device can be a microfluidic paper-based analytical device (µPAD). Analytical devices such as µPADs can be portable and cost friendly.

FIG. 1A is a diagram showing an example implementation of precise fluid input control of point-of-care devices in one embodiment. In an example shown in FIG. 1A, an apparatus or a microfluidic device 110 can include an analytical device 111 and an actuator 112. The microfluidic device 110 can be a paper-based microfluidic device including a plurality of paper substrates arranged in layers (e.g., stacked on top of one another), where each layer of paper substrate can be fabricated with different materials, regions, and/or patterns. The analytical device 111 can be, for example, a microfluidic paper-based analytical device (µPAD). In some examples, the paper substrates being arranged to form the analytical device 111 can include chromatography paper, filter paper, wax-patterned paper, and/or other types of paper substrate. The analytical device 111 can include a microfluidic network that can transport, mix, separate, or process fluids, based on, for example, fluid control using capillary forces.

The actuator 112 can be a paper-based (e.g., composed of paper materials) actuator. Further, the actuator 112 can be a paper-based bilayer actuator including two layers of materials with different swelling rates (e.g., hygroscopic contraction/swelling coefficients). In some examples, the two layers of materials can be paper and polypropylene. Other exemplary materials that can compose the actuator 112 can include, but not limited to, paper with graphene oxide or polydimethylsiloxane (PDMS), nanoporous gold with polyaniline, parafilm with carbon nanotube sheet combined with polymide or polydimethylsiloxane, and/or other types of materials. The two layers of materials with different swelling rates can cause a deformation (e.g., retraction, bending, curving, and/or other types of deformation) of a portion of the actuator 112 in response a collection or absorption of a specific amount of fluid by the actuator 112. For example, as shown in FIG. 1A, the actuator 112 of the microfluidic device 110 can be immersed (or submerged, or dipped, or put one edge in contact) in a pool of liquid 120. The pool of liquid 120 can be, for example, an arbitrary type of fluid or liquid, depending on a desired application of the microfluidic device 110. In response to immersing a portion of the actuator 112 into the liquid 120, a condition 125, such as application of one or more external stimulus, can trigger a deformation of the actuator 112.

In a first example embodiment, the actuator 112 can be a humidity activated bilayer sample acquisition element including an active layer (e.g., paper) and a passive layer or substrate (e.g., polypropylene). In the first example embodiment, the condition 125 can be the exposure to humidity (e.g., an external stimulus). The exposure to humidity can occur when, for example, immersing the actuator 112 in the pool of liquid 120 for a pre-determined or specific amount of time. The actuator 112 can absorb a volume V of liquid 120 in the pre-determined amount of time and gradually deform into a structure 114. In an example, the volume V can be a portion of the pool of liquid 120. In the first example embodiment, the active layer of paper can swell and increase in size significantly more than the passive layer of polypropylene due to the paper layer having a higher hygroscopic expansion coefficient than the polypropylene layer. The difference of hygroscopic expansion coefficient between the two layers can cause the deformation of the actuator 112 in response to an external stimulus of humidity (e.g., when enough volume V of liquid has been absorbed).

In a second example embodiment, the actuator 112 can be a thermo-electrically activated bilayer sample acquisition element including two active layers (e.g., paper and polypropylene). One of the two active layers can have a higher thermal expansion coefficient (e.g., the polypropylene layer) and the other active layer (e.g., the paper layer) can have a higher hygroscopic expansion coefficient. In the second embodiment, the actuator 112 can further include a layer of electrodes (e.g., silver nanowire (AgNW) or a combination of AgNW and poly(3,4-ethylenedioxythiophene) polystyrenesulfonate (PEDOT:PPS)). In the second example embodiment, the condition 125 can be an electrically induced temperature change (e.g., heat) and/or exposure to humidity. The electrically induced expansion of the active layer with the higher thermal expansion coefficient (e.g., the polypropylene layer) can be stronger than the humidity induced expansion on the layer with the lower thermal expansion coefficient (e.g., the paper layer), thus causing the entire actuator to deform into structure 114. The electrically induced temperature change can be induced by, for example, applying a voltage to electrodes integrated in the actuator 112 to heat the actuator 112. The active layer(s) of the actuator 112 having different higher thermal expansion coefficients can deform into the structure 114 in response to the temperature change while absorbing a volume V of fluid determined by the time the actuator was immersed in the liquid. FIG. 1A includes a side perspective view 130 of the microfluidic device 110 including the analytical device 111 and the structure 114.

The deformation of the actuator 112 into the structure 114 can indicate a volume of liquid that has been absorbed by the actuator 112. Therefore, by selecting the materials having different swelling rates to compose the actuator 112 and setting one of 1) a specific time to immerse the actuator 112 into the liquid 120 and, 2) applying specific voltage to the actuator, a precise volume of liquid 120 can be collected by the actuator 112. The volume V of liquid 120 collected by the actuator 112 can be guided, or flow, to an input layer of the analytical device 111 for further processing and analysis. In some examples, a portion of the volume V of liquid 120 absorbed by the actuator 112 can be guided, or flow, to an input layer of the analytical device 111, and the remaining portion of the volume V of liquid 120 can remain on the actuator 112.

Further, the deformation of the actuator 112 into the structure 114 can cause the materials of the actuator 112 to lift or bend away from the liquid 120, such that the materials of the actuator 112 may no longer be in contact with the liquid 120. In an example shown in FIG. 1B, the actuator 112 can be immersed in the liquid 120. After a lapse of time of t1, the actuator 112 can autonomously deform to a structure 113, where a degree of deformation from the actuator 112 to the structure 113 can indicate a first volume of liquid 120 being absorbed by the actuator 112. Note that the structure 113 can still be immersed in the liquid 120. However, after further lapse of time, such as t2, the structure 113 can autonomously deform into the structure 114 and the structure 114 is no longer immersed in the liquid 120. The degree of deformation from the actuator 112 to the structure 114, after a time lapse of t1+t2, can indicate the totality of the volume (e.g., volume V) of liquid 120 that has been absorbed by the actuator 112, where the second volume can be greater than the first volume. Therefore, the deformation of the actuator 112 into the structure 114 can be autonomous, such that a need for external tools and/or manual control for precise collection of liquid sample can be eliminated.

Figure 1B:
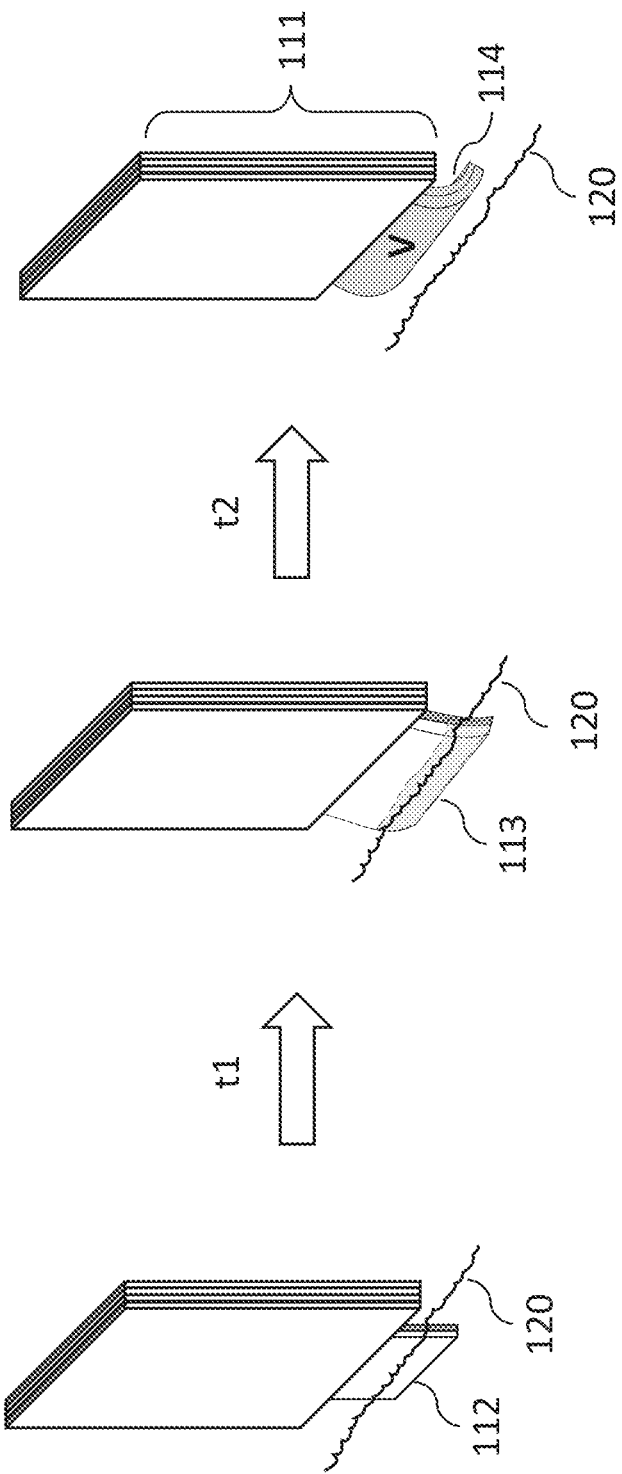
FIG. 1B is a diagram showing another example implementation of precise fluid input control of point-of-care devices in one embodiment.
Figure 2:
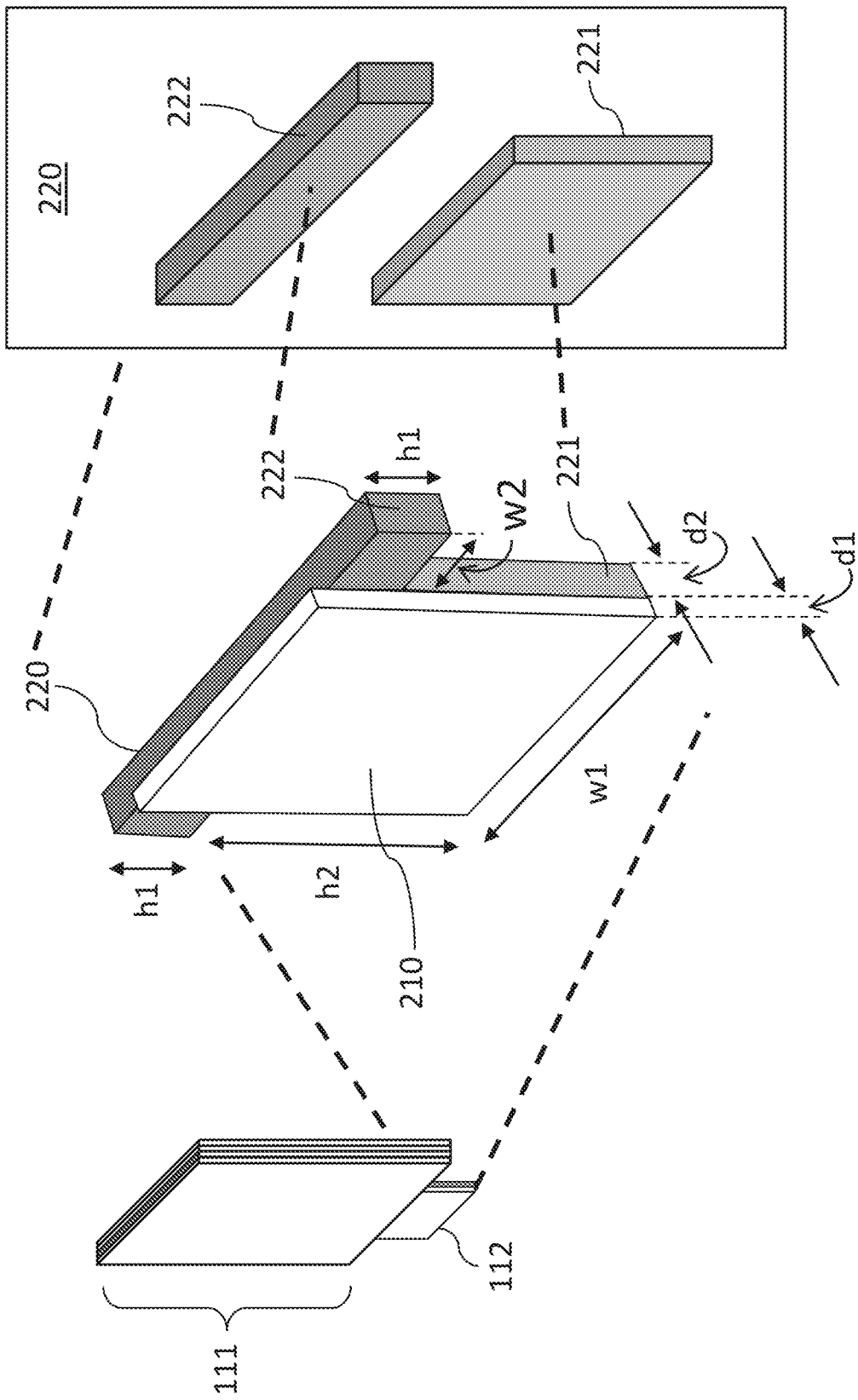
FIG. 2 is a diagram illustrating details of an actuator in one embodiment.

FIG. 2 is a diagram illustrating details of an actuator (e.g., actuator 112 in FIG. 1A and FIG. 1B) in one embodiment. In an example embodiment, the actuator 112 can include a first layer 210 and a second layer 220. The first layer 210 and the second layer 220 can be composed of different materials, such as materials having different swelling rates. For example, the first layer 210 can be composed of chromatography paper and the second layer 220 can be composed of polypropylene. In some example embodiments, the second layer 220 can be composed of polypropylene with self-adhesive. The first layer 210 can have a width w1 and a height h1+h2. The second layer 220 can include a first portion 221 having a width of w1 and a height of h2, and can include a second portion 222 having a width of w1+w2+w2 and a height of h1. In the example shown in FIG. 2, the actuator 112 can be a humidity activated bilayer sample acquisition element including an active layer (e.g., layer 210) and a substrate or passive layer (e.g., layer 220). An example of an active layer can be, for example, a layer of material that can react (e.g., compress or expand) to an external stimulus (e.g., absorption of liquid or fluid). The deformation of the actuator 112 in response to humidity or fluid absorption can be a result of an active layer's reaction to the humidity or fluid absorption. The substrate layer of the bilayer actuator may not react to external stimulus. The reaction (e.g., compress or expand) by the active layer and the lack of reaction by the substrate layer can cause the actuator 112 to deform or retract. In the example of FIG. 2, the relatively higher hygroscopic expansion coefficient of the paper material can cause the paper layer to expand with the absorption of liquid while the relatively lower hygroscopic expansion of the polypropylene material may produce nearly no changes or deformation, eventually causing the deformation of actuator 112 into structure 114 as seen in FIG. 1B The first layer 210 can have a thickness of d1, and the second layer 220 can have a thickness of d2. The thickness of the first layer 210 and the second layer 220 can be same or different. For example, d1 can be 0.18 millimeters (mm) and d2 can be 0.3 mm. Further, a rate of absorption of the actuator 112 can be based on the materials and the thicknesses of the first layer 210 and the second layer 220. For example, if the first layer 210 is chromatography paper with a thickness of d1=0.18 mm, and if the second layer 220 is polypropylene with a thickness d2=0.3 mm, then the actuator 112 can absorb the liquid 120 at a rate of approximately 0.18 microliters ($\mu$L) per square millimeter ($mm^2$), and it can take approximately 120 seconds to capture or absorb approximately 100 $\mu$L of liquid 120.

Figure 3A:
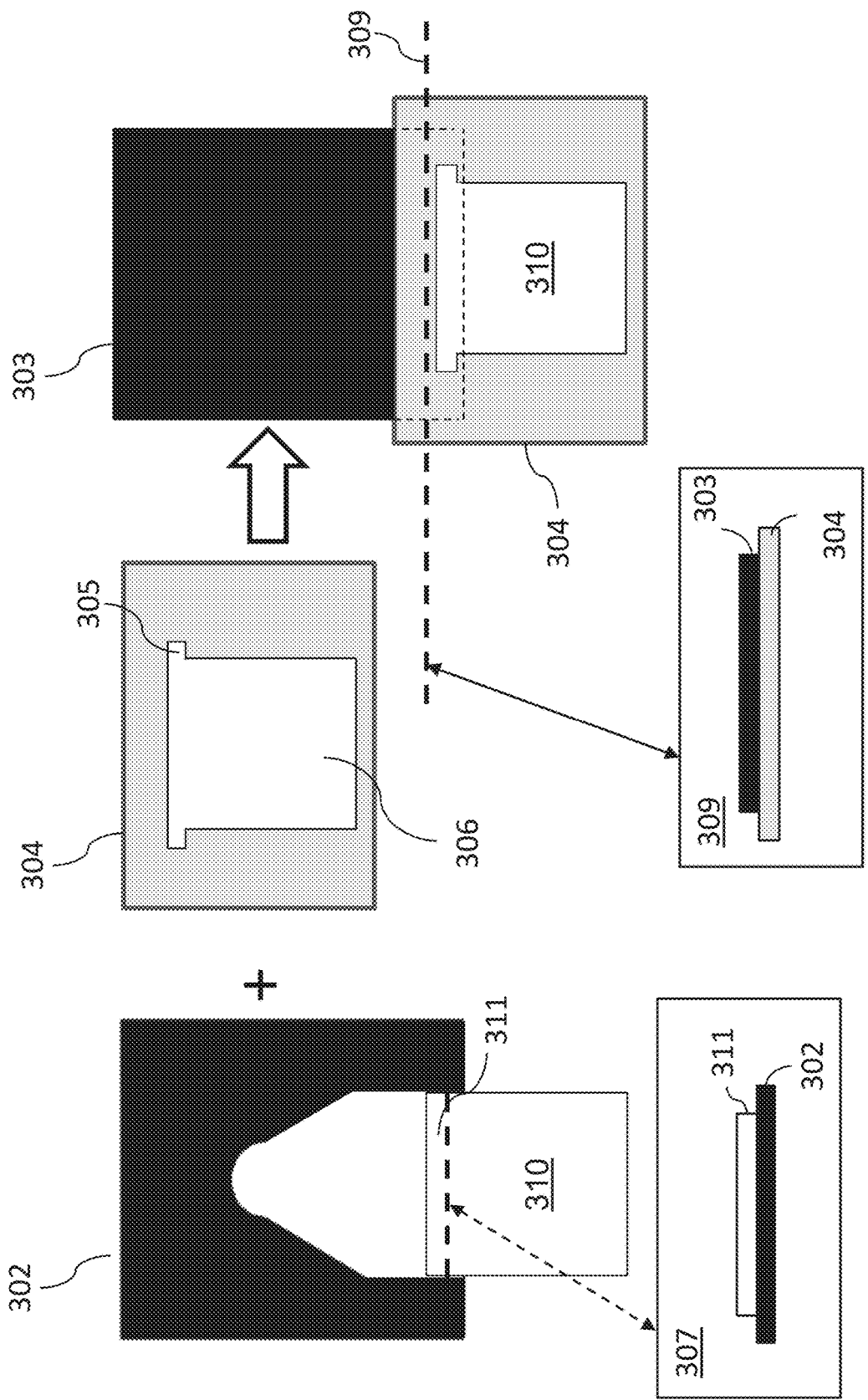
FIG. 3A is a diagram illustrating a fabrication step to create a microfluidic device in accordance with the present disclosure, in one embodiment.

FIG. 3A is a diagram illustrating a fabrication step to create a microfluidic device in accordance with the present disclosure, in one embodiment. In an example shown in FIG. 3A, a first actuator layer 310 can be attached to a substrate layer 302 of the analytical device 111. The first actuator layer 310 can include a portion 311, where the portion 311 can overlay a portion of the substrate layer 302 of the analytical device 111, as shown by a cross section 307 in FIG. 3A. In an example, the first actuator layer 310 can be made of paper. The first actuator layer 310 can be a layer (e.g., the active layer) of a humidity activated bilayer actuator, such as the actuator 112 shown in FIG. 1A-FIG. 2. In an example, the substrate layer 302 can be a paper-based device with wax-printed defined structures.

A mask 304 can be overlaid over a portion of the substrate layer 302 and the first actuator layer 310. In the example shown in FIG. 3, the mask 304 can be overlaid on a backside, or a reverse 303, of the substrate layer 302. In an example, the mask 304 can be a masking tape or a hard mask, and can be made of materials such as plastic, glass, metal, and/or other types of materials. The mask 304 can include a hole, an arbitrary geometry or an opening 306. The opening 306 can have the same shape as the first actuator layer 310, such that when the mask 304 is overlaid over the reverse 303 of the substrate layer 302 and the first actuator layer 310, the first actuator layer 310 can fit in the opening 306. The opening 306 can include a portion 305 that can overlap with the reverse 303 of the substrate 302, and this portion 305 can have a shape equal to portion 311 of the actuator layer 310, or can have a different shape. A thickness of the first actuator layer 310 can be less than, greater than, or equivalent, to a thickness of the substrate layer 302. The mask 304 can mask a portion of the reverse 303 of substrate layer 302, as shown by a cross section 309.

Figure 3B:
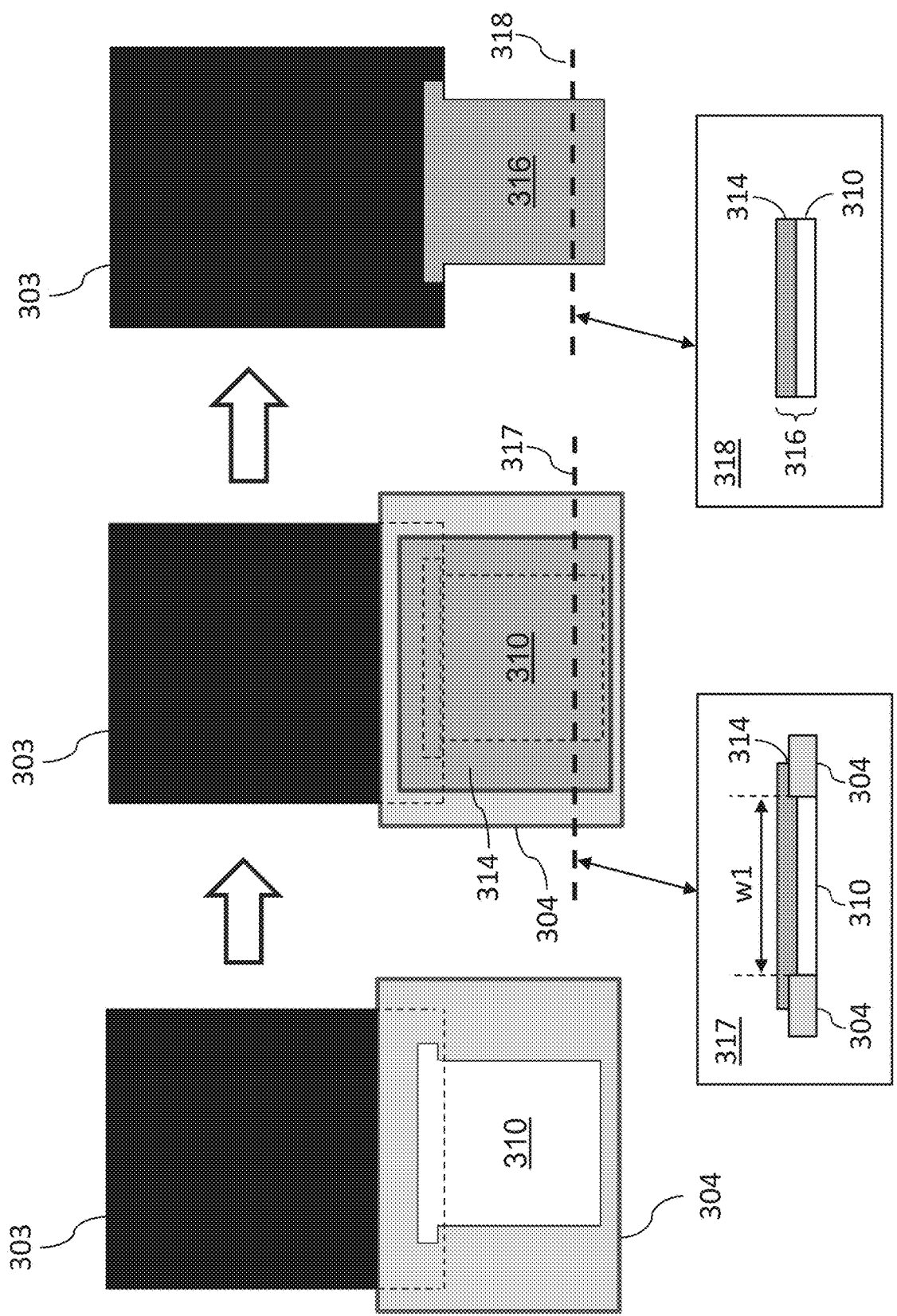
FIG. 3B is a diagram illustrating additional fabrication steps to create a microfluidic device in accordance with the present disclosure, in one embodiment.

FIG. 3B is a diagram illustrating additional fabrication steps to create a microfluidic device in accordance with the present disclosure, in one embodiment. The additional fabrication steps illustrated in FIG. 3B can be a continuation of the fabrication steps shown in FIG. 3A. In an example shown in FIG. 3B, in response to overlaying the mask 304 on the first actuator layer 310 and the reverse 303 of the substrate layer 302, a layer of material 314 can be applied on the first actuator layer 310 and a portion of the mask 304. The material 314 can be, for example, polypropylene. The material 314 can be applied on an entirety of the first actuator layer 310 and a portion of the mask 304, as shown by a cross section 317 in FIG. 3B. Note that in the example shown in cross section 317, a thickness of the material 314 can be greater than a thickness of the actuator layer 310. However, the thickness of the material 314 and the first actuator layer 310 can be arbitrary. The thickness of the mask 304 can be of the same desired thickness of material 314, depending on the technique used to dispose material 314. As example, using silk-screen methodology, mask 304 requires to have the same thickness of material 314. On the other hand, spraying material 314 would not require mask 304 to have the same thickness of material 314. The material 314 can be a material being used to form another actuator layer (e.g., the passive layer) of a humidity activated bilayer actuator, such as the actuator 112 shown in FIG. 1A-2. For example, the material 314 can be polypropylene that can be used to form the second layer 220 shown in FIG. 2. Further, the material 314 can include self-adhesive materials such that disposing the material 314 over the first actuator layer 310 and the mask 304 can cause the material 314 to be attached to the first actuator layer 310 and the mask 304. Furthermore, an area of disposal of the material 314 may not be greater than an area of the mask 304 in order to prevent the material 314 from being attached to the reverse 303 of substrate 302.

In response to disposing the material 314 on the first actuator layer 310 and the mask 304, the mask 304 can be removed. Removing the mask 304 can include removing the portion of the mask 304 that is attached with the material 314. In response to removing the mask 304 and the material 314 that was attached to the mask 304, a second actuator layer, having the material 314, among a bilayer actuator (e.g., the second layer 220 shown in FIG. 2) can be formed. The resulting structure 316 can include the second actuator layer of material 314 and the first actuator layer 310, as shown by a cross section 318.

Figure 3C:
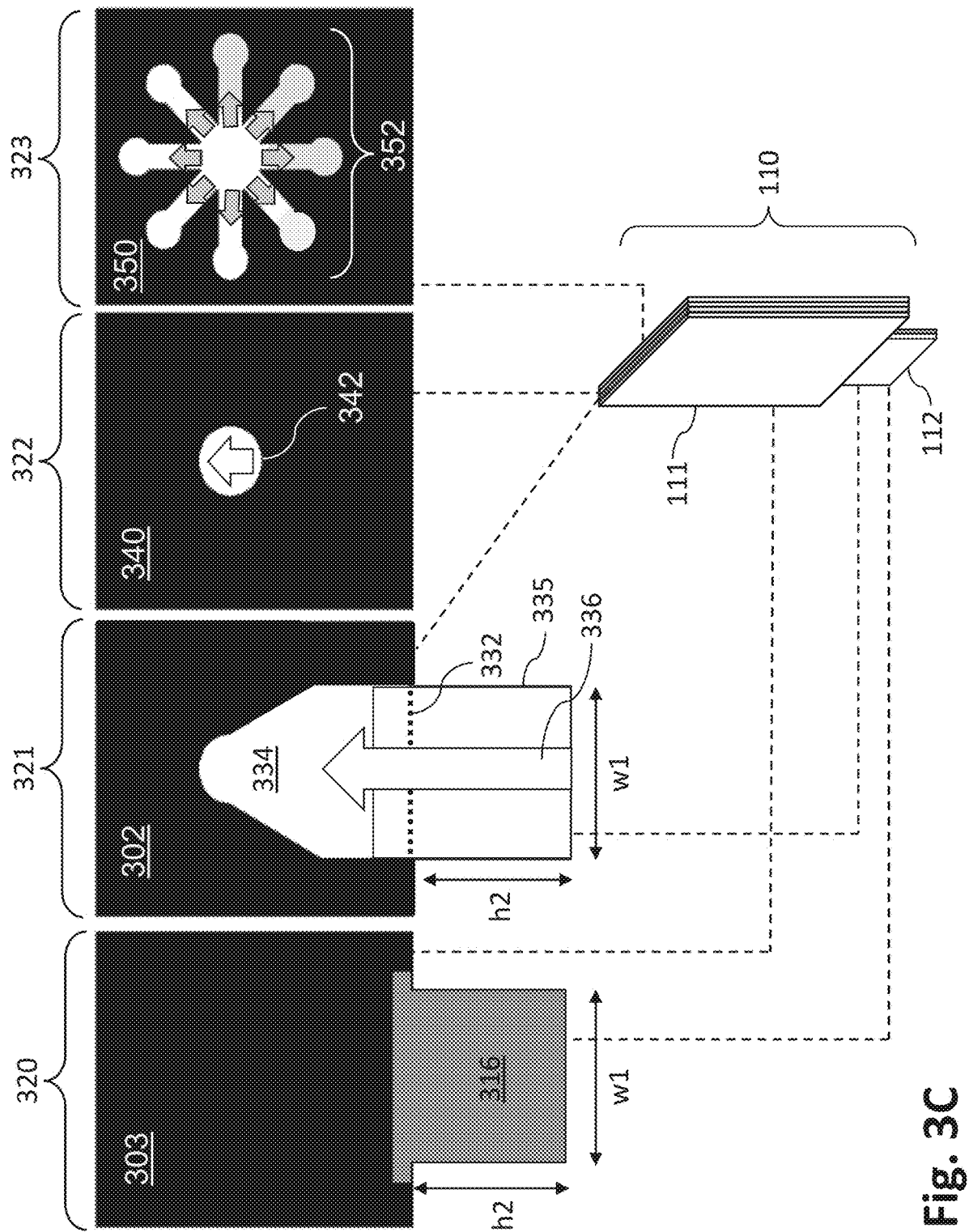
FIG. 3C is a diagram illustrating a plurality of layers of a microfluidic device in accordance with the present disclosure, in one embodiment.

FIG. 3C is a diagram illustrating a plurality of layers of a microfluidic device in accordance with the present disclosure, in one embodiment. In the example shown in FIG. 3C, the reverse 303 of substrate 302 and the material layer 314 of structure 316 can form a first layer 320 of the microfluidic device 110. The layer 314 of structure 316 can be a layer of the actuator 112, and the reverse 303 of substrate 302 can be a layer of the analytical device 111. The structure 316 can have a width w1, and a portion of the structure 316 corresponding to first actuator layer 310 can extend from the substrate 302 by approximately a height or length of h2.

In the example shown in FIG. 3C, a second layer 321 of the microfluidic device 110 can be formed by the substrate 302 and a substrate 334. The substrate 302 can be a paper-based layer with wax printed geometries. The substrate 334 can include a portion 335 having the width w1, where the portion 335 of the substrate 334 can extend from the substrate 302 by approximately the length of h2. The substrate 334 can further include a portion integrated in the substrate 302 corresponding to portion 311 in FIG. 3A. In an example, a shape on the substrate 302 can be patterned by placing wax on the paper-based substrate layer 334, leaving a remaining paper region 334 not covered by wax. The substrate 334 can be, for example, a paper substrate. The extended portion 335 of the substrate 334 can form the first actuator layer 310 of the actuator 112. The first layer 320 and the second layer 321 can be combined (e.g., patterned on opposite sides of the same paper-based substrate or from two separate paper-based substrates stacked on one another) to form an input structure of the microfluidic device 110, where the input structure can collect liquid or fluid flowing from the actuator 112. The input structure formed by the first layer 320 and the second layer 321 can include the actuator 112. In an example, liquid sample being collected or absorbed by the actuator 112 can be absorbed, in direction 336, towards the portion of the substrate 334 situated in the substrate 302. Further, the substrate 334 can include a foldable edge 332 to prevent the deformation of the actuator 112 from deforming the substrate 302.

In the example shown in FIG. 3C, a third layer 322 can include a substrate 340, where the substrate 340 can include a distribution element 342. The substrate 340 can be a paper-based layer with wax printed geometries. The distribution element 342 can be etched or patterned on substrate 340. In some examples, techniques such as inkjet-etching, inkjet-printing, wax printing, laser printing, lithography, three-dimensional (3D) printing, and/or other types of etching, patterning, fabrication techniques can be used to form the substrate 340 and the distribution element 342 of the third layer 322. The third layer 322 can be a layer of the analytical device 111. The liquid sample being collected or absorbed by the substrate 334 situated in the substrate 302 can be collected by the distribution element 342 in response to combining the third layer 322 to the second layer 321.

In the example shown in FIG. 3C, a fourth layer 323 can include a substrate 350, where the substrate 350 can include one or more reaction chambers 352. The substrate 350 can be a paper-based layer with wax printed structure. The reaction chambers 352 can be etched or patterned on substrate 350. In some examples, techniques such as inkjet-etching, inkjet-printing, wax printing, laser printing, lithography, three-dimensional (3D) printing, and/or other types of etching, patterning, fabrication techniques can be used to form the substrate 350 and the reaction chambers 352 of the fourth layer 323. The fourth layer 323 can be a layer of the analytical device 111. The liquid sample being collected or absorbed by the distribution element 342 of the third layer 322 can be distributed to the reaction chambers 352 in response to combining the third layer 322 to the fourth layer 323. The third layer 322 and the fourth layer 323 can be combined (e.g., stacked on one another) to form a reaction layer of the microfluidic device 110. In an example, each reaction chamber among the reaction chambers 352 can be disposed with different chemical reagents. The liquid sample collected by the actuator 112 can be distributed into the reaction chambers 352 and chemical reactions can occur between the collected sample and the different reagents in different reaction chambers. In some examples, the chemical reactions can be visible through the reaction chambers 352 via colorimetric or fluorescent reaction.

The first layer 320, the second layer 321, the third layer 322, and the fourth layer 323 can be combined (e.g., stacked) to form the microfluidic device 110. In response to combining the first layer 320, the second layer 321, the third layer 322, and the fourth layer 323, the actuator 112 can be formed, where the actuator 112 can extend from an edge of the analytical device 111. In an example, an order to combine or stack the various layers shown in FIG. 3C can be the first layer 320, the second layer 321, the third layer 322, and the fourth layer 323. In an example, the first layer 320 and the second layer 321 can be opposite sides of the same substrate layer. In an example, the first layer 320 can be stacked on the second layer 321 such that the reverse 303 of the substrate layer can cover the portion of the substrate 334 situated in the substrate 302. In an example, the second layer 321 can be stacked on the third layer 322 such that the reverse 303 of the substrate layer 302 can cover the distribution element 342 of the substrate 340. The combination of the second layer 321 and the third layer 322 can cause the sample liquid collected at the substrate 334 to be absorbed or collected by the distribution element 342 of the third layer 322. In an example, the third layer 322 can be stacked on the fourth layer 323 such that the substrate 340 can cover the reaction chambers 352 of the substrate 350. Although four layers are shown in the example in FIG. 3C, it shall be apparent to one of ordinary skill in the art that different number of layers can be used to form the microfluidic device 110.

Figure 4:
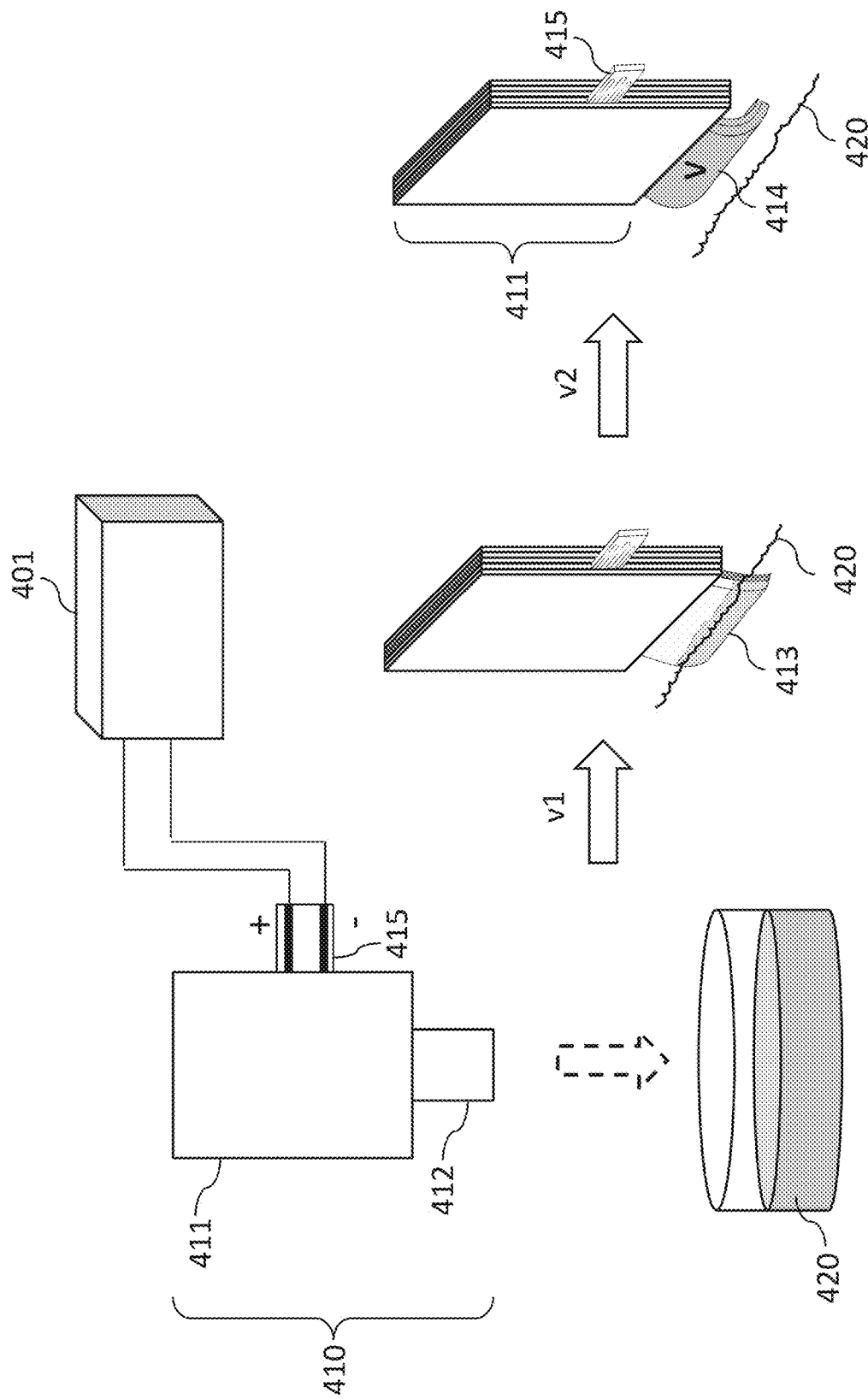
FIG. 4 is a diagram showing another example implementation of precise fluid input control of point-of-care devices in one embodiment.

FIG. 4 is a diagram showing another example implementation of precise fluid input control of point-of-care devices in one embodiment. In an example shown in FIG. 4, an apparatus or a microfluidic device 410 can include an analytical device 411, an actuator 412, and an interface 415. The microfluidic device 410 can be a paper-based microfluidic device including a plurality of paper substrates arranged in layers (e.g., stacked on top of one another), where each layer of paper substrate can be fabricated with different materials, regions, and/or patterns. The analytical device 411 can be, for example, a microfluidic paper-based analytical device (μPAD). In some examples, the paper substrates being arranged to form the analytical device 411 can include chromatography paper, filter paper, and/or other types of paper substrate. The analytical device 411 can include a microfluidic network that can transport, mix, separate, or process fluids, based on, for example, fluid control using capillary forces.

The actuator 412 can be a paper-based (e.g., composed of paper materials) actuator. Further, the actuator 412 can be a paper-based bilayer actuator including two layers of materials with different swelling rates (e.g., hygroscopic and/or thermal contraction coefficients). In some examples, the two layers of materials can be paper and polypropylene. Other exemplary materials that can compose the actuator 412 can include, but not limited to, paper with graphene oxide or polydimethylsiloxane (PDMS), nanoporous gold with polyaniline, parafilm with carbon nanotube sheet combined with polymide or polydimethylsiloxane, and/or other types of materials. The two layers of materials with different swelling rates can cause a deformation (e.g., retraction, bending, curving, and/or other types of deformation) of a portion of the actuator 412 in response a collection or absorption of a specific amount of fluid by the actuator 412 and applied voltage in interface 415 by an external voltage source 401. For example, as shown in FIG. 4, the actuator 412 of the microfluidic device 410 can be immersed (or submerged, or dipped) in a pool of liquid 420 and connected to voltage source 401. The pool of liquid 420 can be, for example, an arbitrary type of fluid or liquid, depending on a desired application of the microfluidic device 410. A deformation of the actuator 412 can occur in response to immersing a portion of the actuator 412 into the liquid 420 and temperature change (e.g., temperature increase) caused by the application of voltage from the voltage source 401

In an example, the actuator 412 can be a thermo-electrically activated bilayer sample acquisition element including two active layers (e.g., paper and polypropylene) and can include electrodes (e.g., silver nanowire (AgNW) or a combination of AgNW and poly(3,4-ethylenedioxythiophene) polystyrenesulfonate (PEDOT:PPS)). The condition 425 can be an application of a voltage, by a voltage source 401, to electrodes integrated in the actuator 412 via the interface 415. The voltage being provided by the voltage source 401 can produce an external stimulus (e.g., heat) to the two active layers among the actuator 412, where the two active layers can react to the provided voltage. The voltage source 401 can be, for example, a voltage generator, a computer device, batteries, power banks and/or other types of electronic devices that can provide a voltage to the interface 415. The interface 415 can be, for example, a standard interface used in various electrical devices such as universal serial bus (USB) and its derivations (micro-USB, mini-USB, USB-C, etc.), to increase end user usability. The application of the voltage can cause the actuator 412 to deform. Different amounts of voltage can cause different degrees of deformation. For example, an application of voltage v1 can cause the actuator 412 to deform into a structure 413, and an application of voltage v1 can cause the actuator 412 to deform into a structure 414.

The deformation of the actuator 412 into the structure 414 can control the volume of liquid that has been absorbed by the actuator 412. Therefore, by selecting the materials having different swelling and thermal expansion rates to compose the actuator 412 and setting a pre-determined voltage to be applied to the actuator 412, a precise volume of liquid 420 can be collected by the actuator 412. For example, the application of voltage v1 can cause deformation of the actuator 412 into the structure 413, but the structure 413 remain immersed in the liquid 420. An increase of the voltage v1 to v2 can allow the application of voltage v2 to the actuator 412, and can cause deformation of the actuator 412 into the structure 414. The deformation of the actuator 412 into the structure 414 can cause the materials of the actuator 412 to lift or bend away from the liquid 420, such that the materials of the actuator 412 may no longer be in contact with the liquid 420. The lack of contact between the structure 414 and the liquid 420 can determine when the desired volume of liquid 420 has been collected by the microfluidic device 410. The volume of liquid 420 collected by the actuator 412 can be guided, or flow, to an input layer of the analytical device 411 for further processing and analysis. The deformation of the actuator 412 into the structure 414 can be autonomous, such that a need for external tools and/or manual control for precise collection of liquid sample can be eliminated. In some examples, a portion of the volume of liquid 420 absorbed by the actuator 412 can be guided, or flow, to an input layer of the analytical device 411, and the remaining portion of the volume of liquid 420 can remain on the actuator 412.

Figure 5:
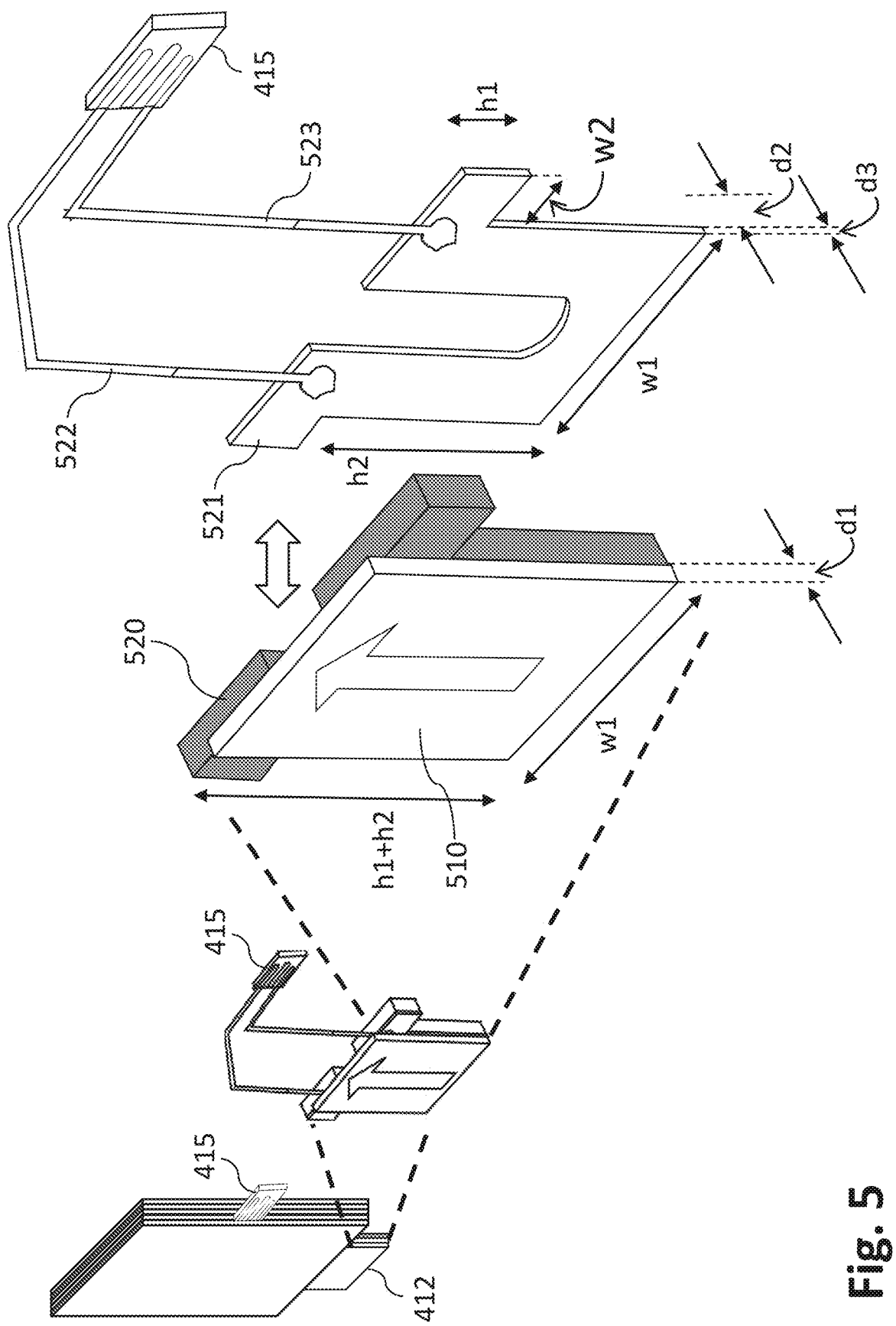
FIG. 5 is a diagram illustrating details of another actuator in one embodiment.

FIG. 5 is a diagram illustrating details of another actuator (e.g., actuator 412 in FIG. 4) in one embodiment. In an example embodiment, the actuator 412 can include a first layer 510 a second layer 520, and a third layer 521. The first layer 510 and the second layer 520 can be composed of different materials, such as materials having different swelling and thermal expansion rates. For example, the first layer 510 can be composed of chromatography paper and the second layer 520 can be composed of polypropylene. In some example embodiments, the second layer 520 can be composed of polypropylene with self-adhesive. The first layer 510 and the second layer 520 can have different shapes and dimensions (e.g., width and height or length) as shown in FIG. 5. In the example shown in FIG. 5, the actuator 412 can be a thermo-electrically activated bilayer sample acquisition element including two active layers (e.g., layers 510 and 520), and can include a third layer of electrodes, such as the third layer 521, to work as heating device. The third layer 521 can be composed of conductive materials such as silver nanowire (AgNW), or a combination of AgNW and poly(3, 4-ethylenedioxythiophene) polystyrenesulfonate (PEDOT:PPS). The third layer 521 can be connected to the interface 415 via one or more contacts, such as contacts 522 and 523. The contacts 522 and 523 can be composed of conductive materials, such as silver nanowire (AgNW), or a combination of AgNW and poly(3,4-ethylenedioxythiophene) polystyrenesulfonate (PEDOT:PPS).

The first layer 510 can have a thickness of d1, the second layer 520 can have a thickness of d2, and the third layer 521 can have a thickness of d3. The thickness of the first layer 510, the second layer 520, and the third layer 521, can be same or different. For example, d1 can be 0.18 millimeters (mm), d2 can be 0.3 mm, and d3 can be approximately 50 nanometers (nm) to 100 nm. Further, a rate of absorption of the actuator 412 can be based on the materials and the thicknesses of the first layer 510, the second layer 520, the third layer 521, and the voltage being applied to the interface 415. For example, if the first layer 210 is chromatography paper with a thickness of d1=0.18 mm, the second layer 220 is polypropylene with a thickness d2=0.3 mm, and the third layer 521 is AgNW with a thickness d3 of approximately 50 to 100 nm, then the actuator 412 can absorb approximately 100 microliters (μL) with an application of approximately 8 volts (V) of voltage to the interface 415.

Figure 6A:
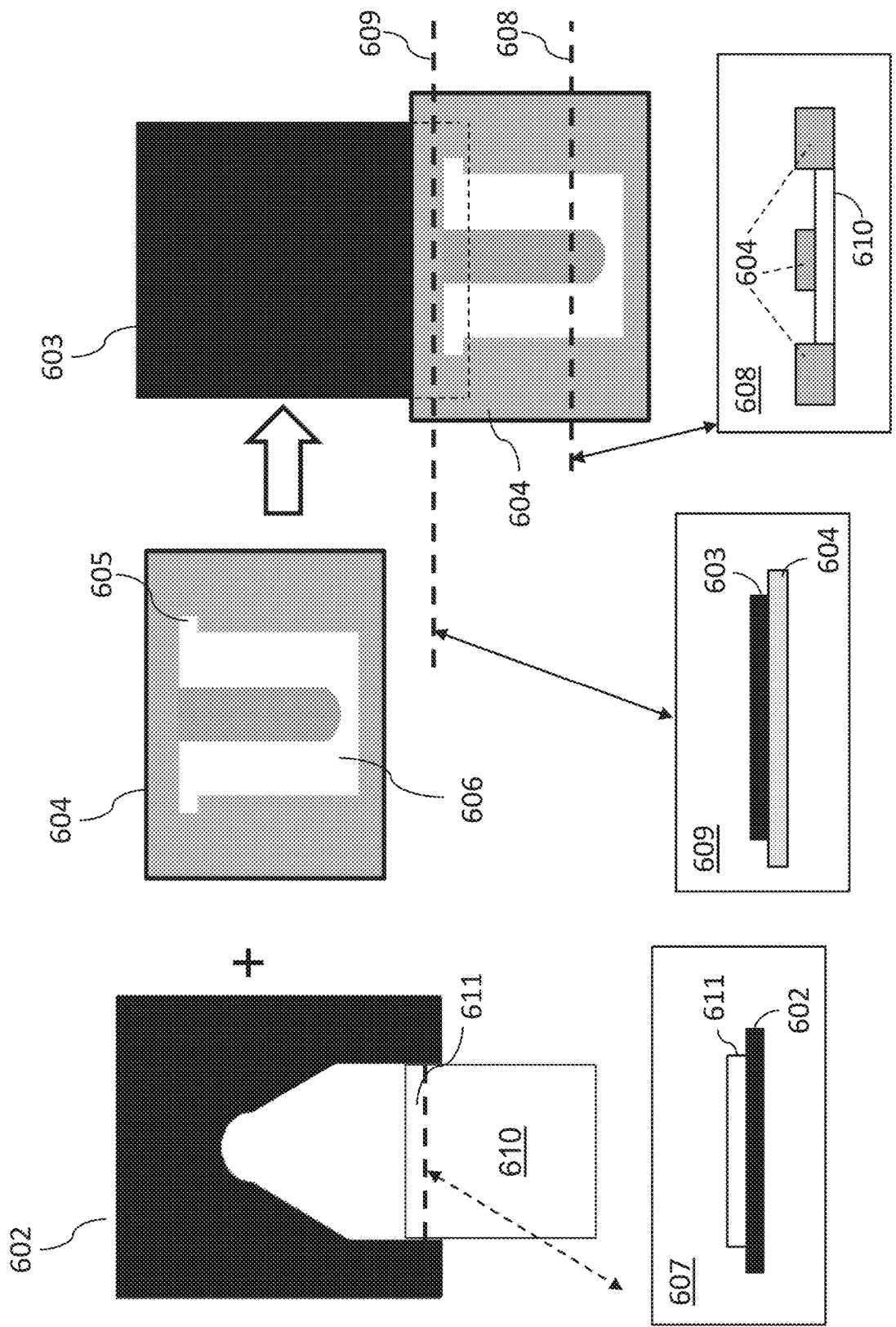
FIG. 6A is a diagram illustrating a fabrication step to create another microfluidic device in accordance with the present disclosure, in one embodiment.

FIG. 6A is a diagram illustrating a fabrication step to create another microfluidic device in accordance with the present disclosure, in one embodiment. In an example shown in FIG. 6A, a piece of actuator layer 610 can be attached to a substrate layer 602 of the analytical device 411. The actuator layer 610 can include a portion 611, where the portion 611 can overlay a portion of the substrate layer 602 of the analytical device, as shown by a cross section 607 in FIG. 6A. In an example, the actuator layer 610 can be made of paper. The paper-layer 610 can be a layer (e.g., an active layer) of the bilayer actuator 412 shown in FIGS. 4-5. In an example, the substrate layer 602 can be a paper-based layer with wax printed structure.

A mask 604 can be overlaid over a portion of the substrate layer 602 and the actuator layer 610. The mask 604 can be overlaid on a backside, or a reverse 603, of the substrate layer 602. In an example, the mask 604 can be a masking tape or a hard mask, and can be made of materials such as plastic, glass, metal, and/or other types of materials. The mask 604 can include a hole or an opening 606. The opening 606 can have a different shape from the actuator layer 610. In the example shown in FIG. 6A, the opening 606 can be a "U" shape in order to accommodate a shape of electrodes that provide uniform heating across the actuator 412. The opening 606 may have a portion 605 that overlaps with the reverse 603 of the substrate layer 602, and this portion 605 can have a shape equal to portion 611 of the actuator layer 610, or can have a different shape. A thickness of the actuator layer 610 can be less than, greater than, or equivalent, to a thickness of the mask 604. In some examples, the mask 604 can have different portions with different thickness. In an example, the mask 604 can mask a portion of the substrate 610, as shown in a cross section 608. Further, the mask 604 can mask a portion of the reverse 603 of substrate layer 602, as shown by a cross section 609.

Figure 6B:
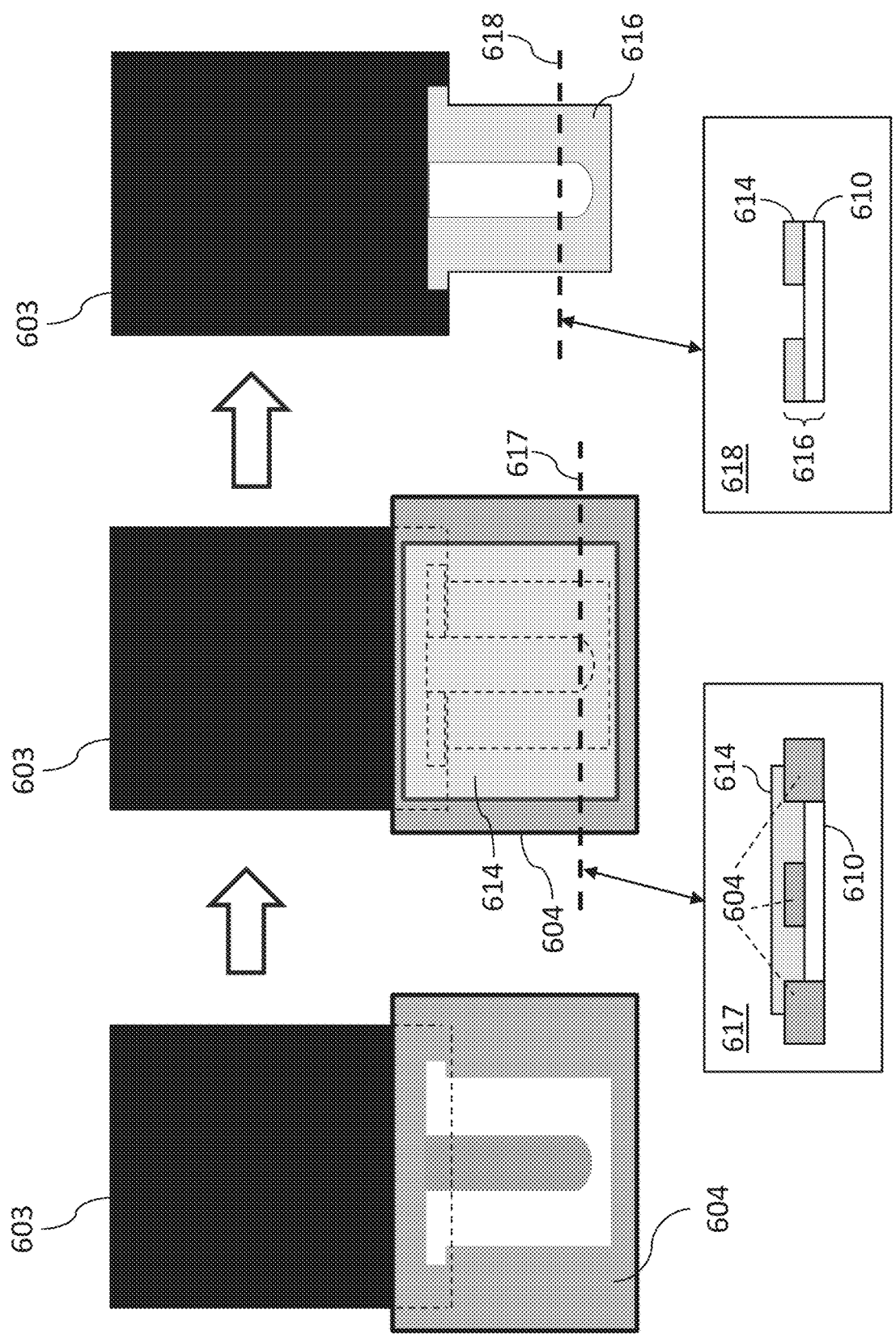
FIG. 6B is a diagram illustrating additional fabrication steps to create another microfluidic device in accordance with the present disclosure, in one embodiment.

FIG. 6B is a diagram illustrating additional fabrication steps to create another microfluidic device in accordance with the present disclosure, in one embodiment. The additional fabrication steps illustrated in FIG. 6B can be a continuation of the fabrication steps shown in FIG. 6A. In an example shown in FIG. 6B, in response to overlaying the mask 604 on the actuator layer 610 and the reverse 603 of substrate layer 602, a layer of material 614 can be disposed on the actuator layer 610 and a portion of the mask 604. The material 614 can be, for example, polypropylene. The material 614 can be disposed on a portion of the actuator layer 610 and a portion of the mask 604, as shown by a cross section 617 in FIG. 6B. The material 614 can be a material being used to form a layer (e.g., another active layer) of a bilayer actuator, such as the actuator 412 shown in FIGS. 4-5. For example, the material 614 can be polypropylene that can be used to form the second layer 520 shown in FIG. 5. Further, the material 614 can include self-adhesive materials such that disposing the material 614 over the actuator layer 610 and the mask 604 can cause the material 614 to be attached to the actuator layer 610 and the mask 604. Further, an area of disposal of the material 614 may not be greater than an area of the mask 604 in order to prevent the material 614 from being attached to the reverse 603 of the substrate layer 602.

In response to disposing the material 614 on the actuator layer 610 and the mask 604, the mask 604 can be removed. Removing the mask 604 can include removing the portion of the mask 604 that is attached with the material 614. In response to removing the mask 604 and the material 614 that was attached to the mask 604, a second actuator layer 614 among a bilayer actuator (e.g., the second layer 520 shown in FIG. 5) can be formed. The resulting structure 616 can include the second actuator layer of material 614 and the first actuator layer 610, as shown by a cross section 618.

Figure 6C:
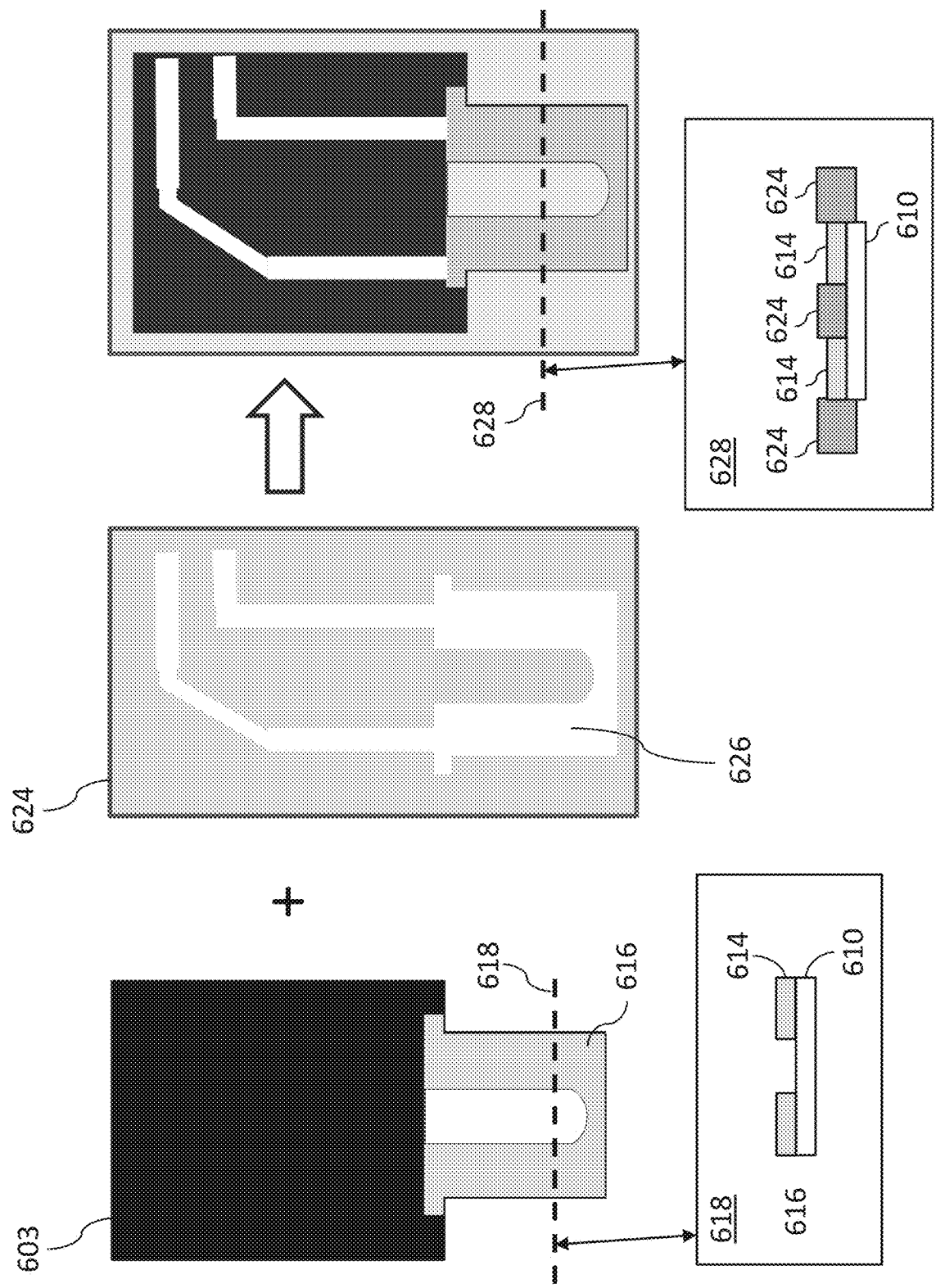
FIG. 6C is a diagram illustrating additional fabrication steps to create another microfluidic device in accordance with the present disclosure, in one embodiment.

FIG. 6C is a diagram illustrating additional fabrication steps to create another microfluidic device in accordance with the present disclosure, in one embodiment. The additional fabrication steps illustrated in FIG. 6C can be a continuation of the fabrication steps shown in FIG. 6B. In an example shown in FIG. 6C, a mask 624 can overlay the reverse 603 of the substrate layer 602 and the layer of material 614 of structure 616. In an example, the mask 624 can be a masking tape or a hard mask, and can be made of materials such as plastic, glass, metal, and/or other types of materials. The mask 624 can include a hole, arbitrary geometry or an opening 626. The opening 626 can include a portion that has a same shape as the shape of the structure 616, such that when the mask 624 is overlaid on the structure 616, the structure 616 can fit in the opening 626. Further, the opening 626 can include another portion having shapes of contacts (e.g., contacts 522, 523 shown in FIG. 5) that can be used to facilitate application of voltage to a bilayer actuator including the structure 616. In some examples, the mask 624 can have different portions with different thickness. Further, the mask 624 can mask the reverse 603 of the substrate layer 602, as shown by a cross section 628

Figure 6D:
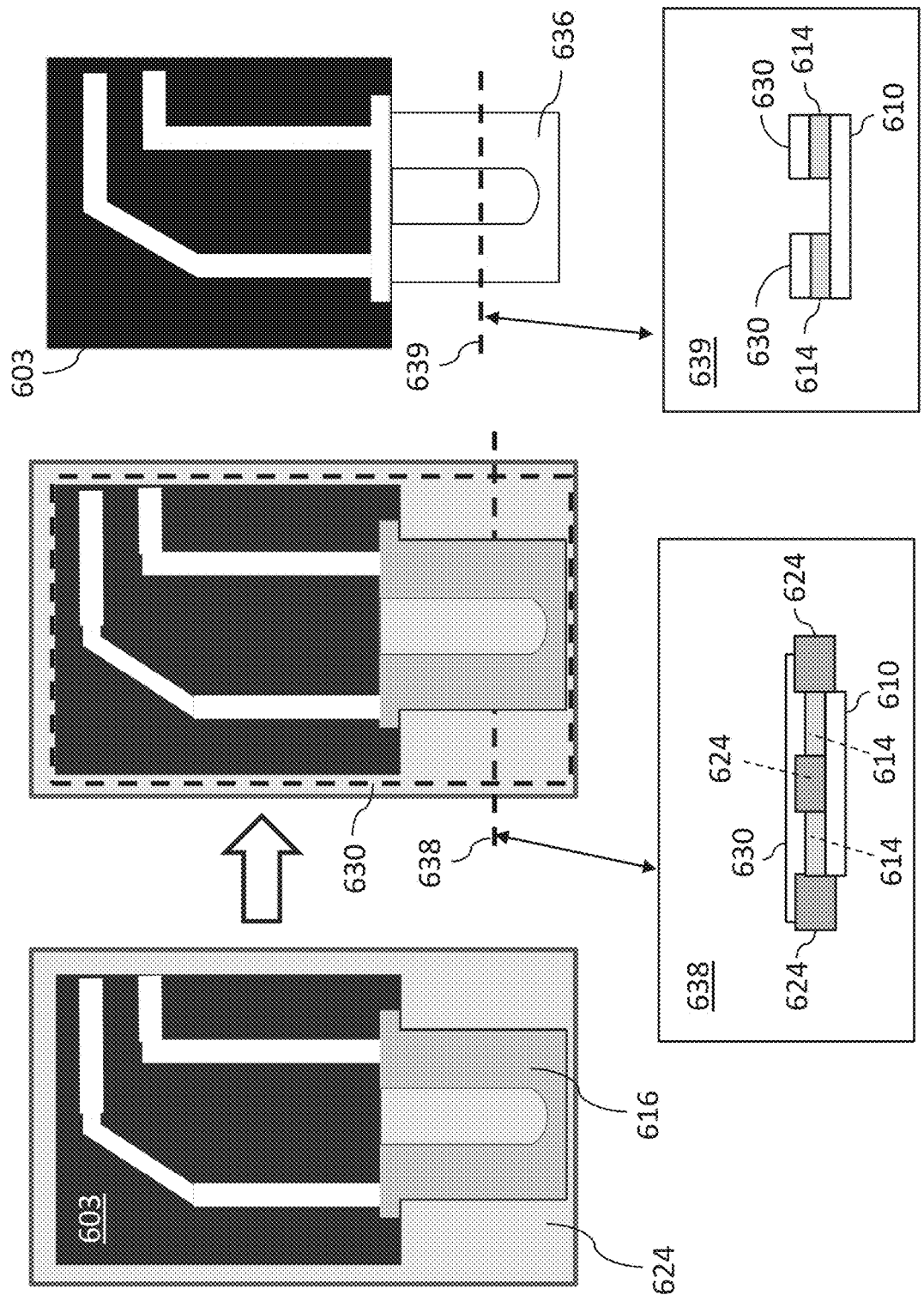
FIG. 6D is a diagram illustrating additional fabrication steps to create another microfluidic device in accordance with the present disclosure, in one embodiment.

FIG. 6D is a diagram illustrating additional fabrication steps to create another microfluidic device in accordance with the present disclosure, in one embodiment. The additional fabrication steps illustrated in FIG. 6D can be a continuation of the fabrication steps shown in FIG. 6C. In an example shown in FIG. 6D, in response to overlaying the mask 624 on the reveres 603 of the substrate layer 602 and the layer of material 614 of structure 616, a layer of material 630 can be disposed on the mask 624. The material 630 can be disposed on a portion of the structure 616 (e.g., on the material 614) and a portion of the mask 624, as shown by a cross section 638 in FIG. 6D. The material 630 can be a material being used to form a layer of electrodes (e.g., third layer 521 shown in FIG. 5) on a bilayer actuator, such as the actuator 412 shown in FIGS. 4-5. For example, the material 630 can be silver nanowire (AgNW), or a combination of AgNW and poly(3,4-ethylenedioxythiophene) polystyrenesulfonate (PEDOT:PPS).

In response to disposing the material 630 on the mask 624, the mask 624 can be removed. Removing the mask 624 can include removing the portion of the mask 624 that is attached with the material 630. In response to removing the mask 624 and the material 630 that was attached to the mask 624, a structure 636 (e.g., a combination of the first layer 510, the second layer 520 and the third layer 521 shown in FIG. 5) among a bilayer actuator (e.g., actuator 412) can be formed. The structure 636 can include the material 630, the material 614, and the first actuator layer 610, as shown by a cross section 639.

Figure 6E:
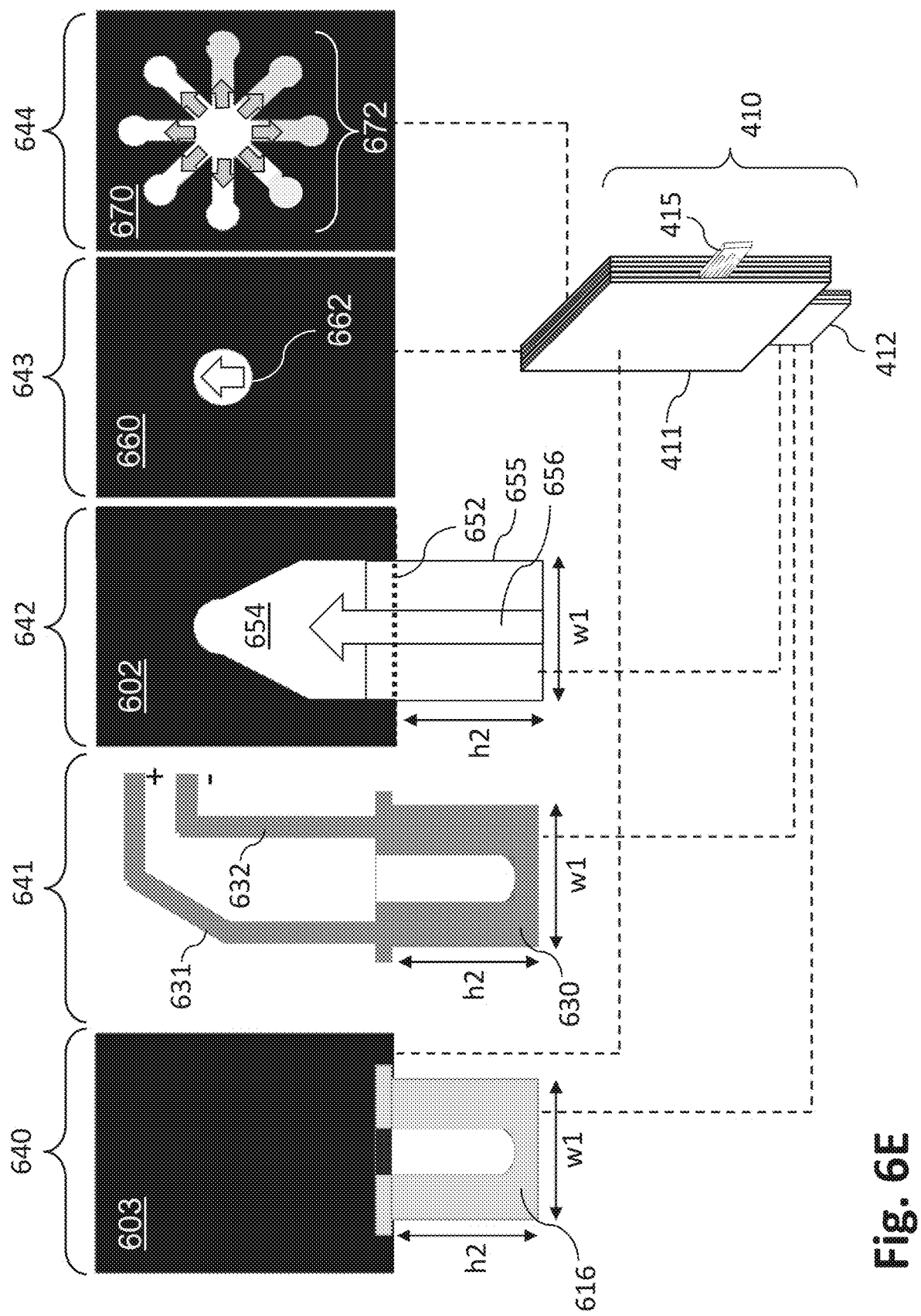
FIG. 6E is a diagram illustrating a plurality of layers of another microfluidic device in accordance with the present disclosure, in one embodiment.

FIG. 6E is a diagram illustrating a plurality of layers of another microfluidic device in accordance with the present disclosure, in one embodiment. In the example shown in FIG. 6E, the reverse 603 of the substrate layer 602 and the structure 616 can form a first layer 640 of the microfluidic device 410. The structure 616 can be a layer of the actuator 412, and the reverse 603 of the substrate layer 602 can be a layer of the analytical device 411. The structure 616 can have a width w1, and a portion of the structure 616 can extend from the reverse 603 of the substrate layer 602 by approximately a height or length of h2.

In the example shown in FIG. 6E, a second layer 641 of the microfluidic device 410 can be formed by a layer of material 630. The layer of material 630 can include contacts 631 and 632, where the contacts 631 and 632 can connect the layer 630 to the interface 415 of the microfluidic device 410.

In the example shown in FIG. 6E, a third layer 642 of the microfluidic device 410 can be formed by the substrate layer 602 and a substrate 654. The substrate layer 602 can be a paper-based layer with wax printed geometries. The substrate 654 can be in contact with a portion 655 having the width w1, where the portion 655 corresponds to first actuator layer 610 and can extend from the substrate 602 by approximately the length of h2, and where a portion 611 of the first actuator layer can overlap with substrate 654. The substrate 654 can further include a portion integrated in the substrate layer 602. In an example, a shape on the substrate layer 602 can be patterned by placing wax on the paper-based substrate layer 602, leaving a remaining paper region 654 not covered by wax. The substrate 654 can be, for example, a paper substrate. The extended portion 655 of the substrate 654 can form the first layer of the actuator 412. The first layer 640, the second layer 641, and the third layer 642 can be combined (e.g., patterned on opposite sides of the same paper-based substrate or from two separate paper-based substrates stacked on one another) to form an input layer of the microfluidic device 410. The second layer 641 can be situated between the first layer 640 and the third layer 642. The input layer formed by the first layer 640, the second layer 641, and the third layer 642 can include the actuator 412. In an example, liquid sample being collected or absorbed by the actuator 412 can be absorbed, in a direction 656, into the portion of the substrate 654 situated in the substrate layer 602. Further, the substrate 654 can include a foldable edge 652 to prevent the deformation of the actuator 412 from deforming the substrate 602.

In the example shown in FIG. 6E, a fourth layer 643 can include a substrate 660, where the substrate 660 can include a distribution element 662. The substrate 660 can be a paper-based layer with wax printed geometries. The distribution element 662 can be etched or patterned on substrate 660. In some examples, techniques such as inkjet-etching, inkjet-printing, wax printing, laser printing, lithography, three-dimensional (3D) printing, and/or other types of etching, patterning, fabrication techniques can be used to form the substrate 660 and the distribution element 662 of the fourth layer 643. The fourth layer 643 can be a layer of the analytical device 411. The liquid sample being collected or absorbed by the substrate 654 situated in the substrate layer 602 can be collected by the distribution element 662 in response to combining the fourth layer 643 to the third layer 642.

In the example shown in FIG. 6E, a fifth layer 644 can include a substrate 670, where the substrate 670 can include one or more reaction chambers 672. The substrate 670 can be a paper-based layer with wax printed structure. The reaction chambers 672 can be etched or patterned on substrate 670. In some examples, techniques such as inkjet-etching, inkjet-printing, wax printing, laser printing, lithography, three-dimensional (3D) printing, and/or other types of etching, patterning, fabrication techniques can be used to form the substrate 670 and the reaction chambers 672 of the fifth layer 644. The fifth layer 644 can be a layer of the analytical device 411. The fourth layer 643 and the fifth layer 644 can be combined (e.g., stacked on one another) to form a reaction layer of the microfluidic device 410. The liquid sample being collected or absorbed by the distribution element 662 of the fourth layer 643 can be distributed to the reaction chambers 672 in response to combining the fourth layer 643 to the fifth layer 644. In an example, each reaction chamber among the reaction chambers 672 can be disposed with different chemical reagents. The liquid sample collected by the actuator 412 can be distributed into the reaction chambers 672 and chemical reactions can occur between the collected sample and the different reagents in different reaction chambers. In some examples, the chemical reactions can be visible through the reaction chambers 672.

The first layer 640, the second layer 641, the third layer 642, the fourth layer 643, and the fifth layer 644 can be combined (e.g., stacked) to form the microfluidic device 410. In response to combining the first layer 640, the second layer 641, the third layer 642, the fourth layer 643, and the fifth layer 644, the actuator 412 can be formed, where the actuator 412 can extend from an edge of the analytical device 411. In an example, an order to combine or stack the various layers shown in FIG. 6E can be the first layer 640, the second layer 641, the third layer 642, the fourth layer 643, and the fifth layer 644. In an example, the first layer 640 with second layer 641, and the third layer 642 can be opposite sides of the same substrate layer. In an example, the third layer 642 can be stacked on the fourth layer 643 such that the substrate 602 can cover the distribution element 662 of the substrate 660. The combination of the third layer 642 and the fourth layer 643 can cause the sample liquid collected at the substrate 654 to be absorbed or collected by the distribution element 662 of the fourth layer 643. In an example, the fourth layer 643 can be stacked on the fifth layer 644 such that the substrate 660 can cover the reaction chambers 672 of the substrate 670. Although five layers are shown in the example in FIG. 6E, it shall be apparent to one of ordinary skill in the art that different number of layers can be used to form the microfluidic device 410.

The microfluidic devices (e.g., microfluidic devices 110, 410) described herein can provide a precise liquid sample collection in, for example, the microliter range, and the measurement of the volume of collected liquid sample collection can be autonomous. The actuator of the microfluidic devices described herein can be bilayer actuators, where one layer can expand and the other layer can contract in response to applications of external stimulus such as immersion into liquid for an amount of time and/or application of electrical voltages. The contraction and expansion between different layers can cause the actuator to deform, and a degree of the deformation can indicate a volume of liquid sample collected by the microfluidic device and/or device heating time. Thus, by controlling the materials being used to compose the actuator, controlling a time of immersion, and/or controlling a voltage being applied, a volume of sample liquid being absorbed or collected can be controlled precisely.

FIG. 7 is a flow diagram illustrating a process 700 to implement precise fluid input control of point-of-care devices in one embodiment. The process 700 can include one or more operations, actions, or functions as illustrated by one or more of blocks 702, 704, 706, and/or 708. Although illustrated as discrete blocks, various blocks can be divided into additional blocks, combined into fewer blocks, eliminated, or performed in parallel, depending on the desired implementation.

The process 700 can begin at block 702. At block 702, an actuator of a microfluidic device can be immersed into a pool of fluid to cause an absorption of the fluid by the actuator. The actuator can be connected to an analytical device of the microfluidic device. In some examples, the actuator can include a first layer of a first material and a second layer of a second material. The first material and the second material can have different swelling rates. In some examples, the first material can be paper and the second material can be polypropylene. In some examples, the analytical device can be a paper-based analytical device (µPAD). In some examples, the actuator can further include a third layer of a third material. The third material can be a conductive material.

The process 700 can continue from block 702 to block 704. At block 704 an absorption condition can be set to control a volume of fluid being collected by the analytical device. The actuator can deform in response to an occurrence of the absorption condition. A degree of the deformation of the actuator can indicate the volume of fluid being collected by the analytical device. In some examples, the absorption condition can be a pre-determined amount of time for the actuator to absorb the volume of fluid (block 706) and achieve the degree of deformation needed to remove contact with the liquid. In some examples, the absorption condition can be a pre-determined amount of voltage being applied to the actuator via the third layer of material in response to immersing the actuator to a pool of fluid (block 708).

FIG. 8 is a flow diagram illustrating a process 800 to form a microfluidic device in one embodiment. The process 800 can include one or more operations, actions, or functions as illustrated by one or more of blocks 802, 804, and/or 806. Although illustrated as discrete blocks, various blocks can be divided into additional blocks, combined into fewer blocks, eliminated, or performed in parallel, depending on the desired implementation.

The process 800 can begin at block 802, where an input layer can be formed by combining a first layer with a second layer. The first layer can include a first substrate layer of a paper-based analytical device (µPAD) and a first actuator layer. The first actuator layer can be extended from an edge of the first substrate layer of a µPAD by a specific length. The first actuator layer can be composed of a first material. The second layer can include a second substrate layer of a µPAD and a second actuator layer. The second actuator layer can be extended from an edge of the second substrate layer of a µPAD by the specific length. The second actuator layer can be composed of a second material different from the first material. In some examples, the first material and the second material can have different swelling rates. In some examples, the first material can be paper and the second material can be polypropylene. In some examples, the first substrate layer of the µPAD and the second substrate layer of the µPAD can be composed of paper and wax.

In some examples, the second layer can be formed with a layer of conductive materials. In some examples, the layer of conductive materials can be situated between the first actuator layer and the second actuator layer. In some examples, the layer of conductive materials can be attached to a layer of active material (e.g., layer of polypropylene) such that voltage being provided to the layer of conductive materials can stimulate the active material. In some examples, the layer of conductive materials can be one of silver nanowire (AgNW) and a combination of AgNW and poly(3,4-ethylenedioxythiophene) polystyrenesulfonate (PEDOT:PPS).

The process 800 can proceed from block 802 to block 804. At block 804, a reaction layer can be formed by combining a third layer of the µPAD including a distribution element with a fourth layer of the µPAD including at least one reaction chamber. The process 800 can proceed from block 804 to block 806. At block 806, the input layer and the reaction layer can be combined to form a microfluidic device. The formed microfluidic device can include an actuator. The actuator can include the first actuator layer and the second actuator layer. The actuator can deform in response to an occurrence of an absorption condition relating to an immersion of the actuator in a pool of liquid.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   an analytical device;
   an actuator connected to the analytical device, the actuator being configured to: absorb fluid; guide the absorbed fluid to an input layer of the analytical device; and deform in response to an occurrence of an absorption condition, wherein a degree of deformation of the actuator indicates a volume of fluid collected by the analytical device.

2. The apparatus of claim 1, wherein the actuator comprises a first layer of a first material and a second layer of a second material, the first material and the second material having different swelling rates.

3. The apparatus of claim 2, wherein the first material is paper and the second material is polypropylene.

4. The apparatus of claim 1, wherein the absorption condition includes the actuator absorbing the fluid for a pre-determined amount of time.

5. The apparatus of claim 4, wherein the volume of fluid collected by the analytical device is based on the pre-determined amount of time.

6. The apparatus of claim 1, wherein the analytical device is a microfluidic paper-based analytical device (μPAD).

7. The apparatus of claim 1, wherein the actuator comprises a first layer of a first material, a second layer of a second material, and a third layer of a third material, the first material and the second material having different swelling rates, and the third material being a conductive material.

8. The apparatus of claim 7, wherein the layer of conductive materials is one of:
   silver nanowire (AgNW); and
   a combination of AgNW and poly(3,4-ethylenedioxythiophene) polystyrenesulfonate (PEDOT:PPS).

9. The apparatus of claim 7, wherein the absorption condition is an application of a pre-determined amount of voltage to the actuator via the third layer of material.

10. The apparatus of claim 9, wherein the volume of fluid collected by the analytical device is based on the pre-determined amount of voltage.

11. A method for controlling a volume of fluid being collected by an analytical device, the method comprising:
    immersing an actuator of a microfluidic device into a pool of fluid to cause an absorption of the fluid by the actuator, the actuator being connected to an analytical device of the microfluidic device; and
    setting an absorption condition to control a volume of fluid being collected by the analytical device, wherein the actuator deforms in response to an occurrence of the absorption condition, and a degree of the deformation of the actuator indicates the volume of fluid being collected by the analytical device.

12. The method of claim 11, wherein the actuator comprises a first layer of a first material and a second layer of a second material, the first material and the second material having different swelling rates.

13. The method of claim 12, wherein the first material is paper and the second material is polypropylene.

14. The method of claim 9, wherein setting the absorption condition comprises setting a pre-determined amount of time for the actuator to absorb the volume of fluid.

15. The method of claim 11, wherein the analytical device is a microfluidic paper-based analytical device (μPAD).

16. The method of claim 11, wherein the actuator comprises a first layer of a first material, a second layer of a second material, and a third layer of a third material, the first material and the second material having different swelling rates, and the third material being a conductive material.

17. The method of claim 16, wherein the layer of conductive materials is one of:
    silver nanowire (AgNW); and
    a combination of AgNW and poly(3,4-ethylenedioxythiophene) polystyrenesulfonate (PEDOT:PPS).

18. The method of claim 16, wherein setting the absorption condition comprises setting a pre-determined amount of voltage to be applied to the actuator via the third layer of material in response to immersing the actuator to a pool of fluid.

19. A method for forming a microfluidic device, the method comprising:
    forming an input layer by combining:
       a first layer including a first substrate and a first actuator layer, the first actuator layer being extended from an edge of the first substrate by a specific length, and the first actuator layer is composed of a first material;
       a second layer including a second substrate and a second actuator layer, the second actuator layer being extended from an edge of the second substrate by the specific length, and the second actuator layer is composed of a second material different from the first material;
    forming a reaction layer by combining:
       a third layer including a distribution element;
       a fourth layer including at least one reaction chamber; and
    combining the input layer and the reaction layer to form a microfluidic device, wherein the formed microfluidic device comprises an analytical device and an actuator, the actuator includes the first actuator layer and the second actuator layer, and the actuator deforms in response to an occurrence of an absorption condition relating to an immersion of the actuator in a pool of liquid.

20. The method of claim 19, wherein forming the input layer comprises combining the first layer and the second layer with a layer of conductive materials.

21. The method of claim 19, wherein the layer of conductive materials is one of:
   silver nanowire (AgNW); and
   a combination of AgNW and poly(3,4-ethylenedioxythiophene) polystyrenesulfonate (PEDOT:PPS).

22. The method of claim 19, wherein the first material and the second material have different swelling rates.

23. The method of claim 19, wherein the first material is paper and the second material is polypropylene.

24. The method of claim 19, wherein the first substrate and the second substrate are composed of paper and wax.

25. The method of claim 19, wherein the analytical device is a microfluidic paper-based analytical device (µPAD).

* * * * *